United States Patent [19]

Freeman

[11] 4,107,026
[45] Aug. 15, 1978

[54] SYSTEM AND METHOD FOR ELECTRIC DEWATERING OF SOLIDS SUSPENSION

[75] Inventor: Mark P. Freeman, Darien, Conn.

[73] Assignee: Dorr-Oliver Incorporated, Stamford, Conn.

[21] Appl. No.: 697,142

[22] Filed: Jun. 17, 1976

[51] Int. Cl.² ............................................. B01D 13/02
[52] U.S. Cl. ................................ 204/300 R; 204/152;
204/180 R; 204/299 R; 210/406; 210/416 R
[58] Field of Search .................... 204/180 R, 299, 300,
204/152; 210/416, 406

[56] References Cited

U.S. PATENT DOCUMENTS

| | | | |
|---|---|---|---|
| 1,435,886 | 11/1922 | Acton et al. | 204/180 R |
| 2,900,320 | 8/1959 | Metcalfe et al. | 204/300 |
| 2,944,952 | 7/1960 | McMinn, Jr. | 204/180 R |
| 3,642,605 | 2/1972 | Chenel et al. | 204/300 |
| 3,679,565 | 7/1972 | Gilchrist | 204/180 R |
| 3,972,799 | 8/1976 | Taylor et al. | 204/180 R X |
| 3,980,547 | 9/1976 | Kunkle | 204/180 R X |
| 4,048,038 | 9/1977 | Kunkle | 204/180 R X |

*Primary Examiner*—Arthur C. Prescott
*Attorney, Agent, or Firm*—Burtsell J. Kearns; Harold M. Snyder

[57] ABSTRACT

A system and method for dewatering of a suspension of solids in an electric field controllably maintained between a pair of opposing self-contained electrode structures, to cause the solids to migrate relative to the carrier liquid to form a layer or cake on the respective self-contained electrode structure, while allowing carrier liquid to be withdrawn under vacuum in the opposite direction through the liquid - pervious wall of a hollow self-contained counter electrode structure, combined with means for controlling the rate of filtrate liquid withdrawal consistent and compatible with the relative speed of migration of the solids in the carrier liquid, and wherein said layer or cake material may be detached from said electrode structure, for instance during exposure from the suspension.

43 Claims, 24 Drawing Figures

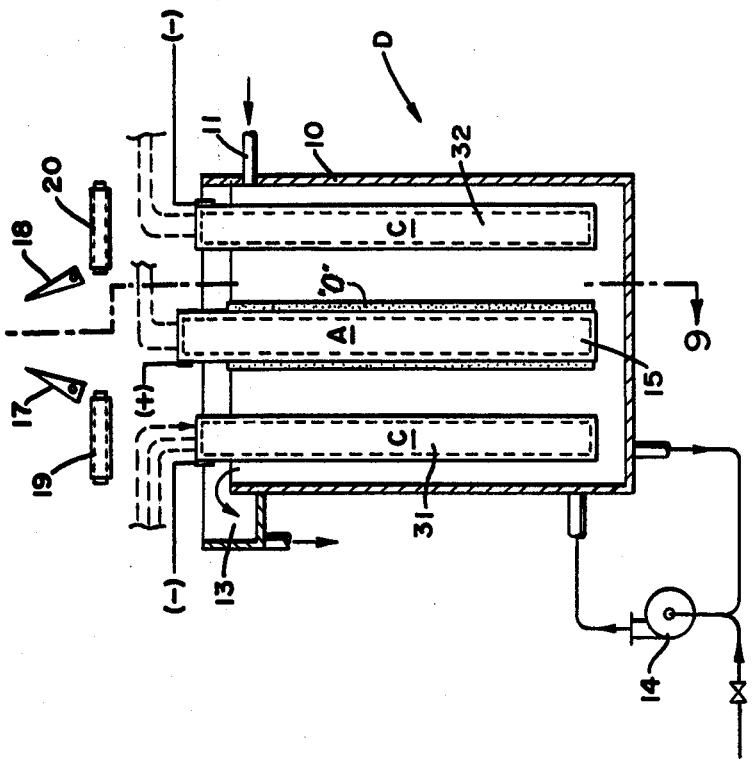
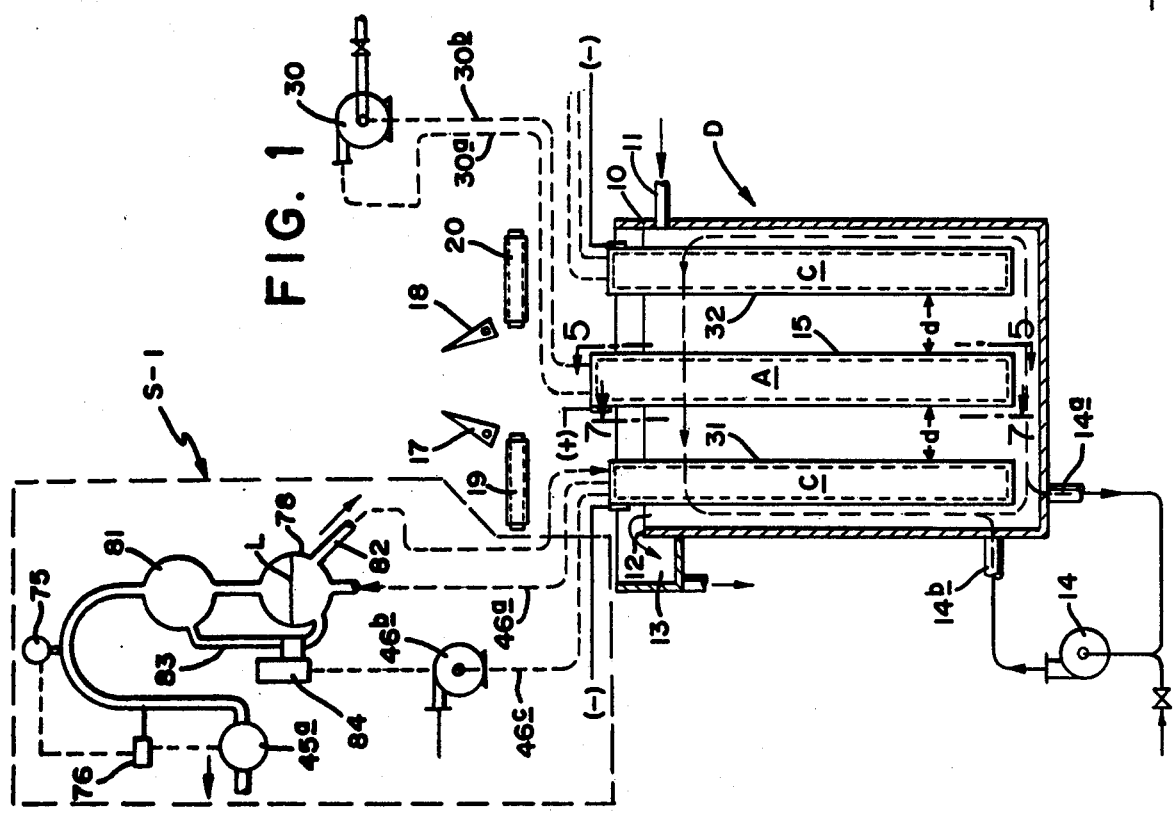

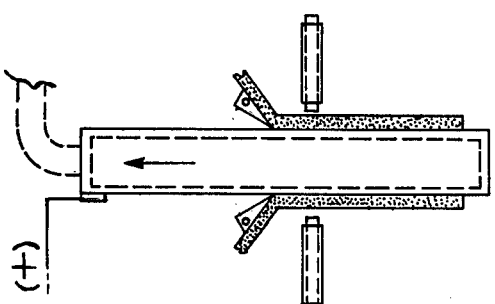
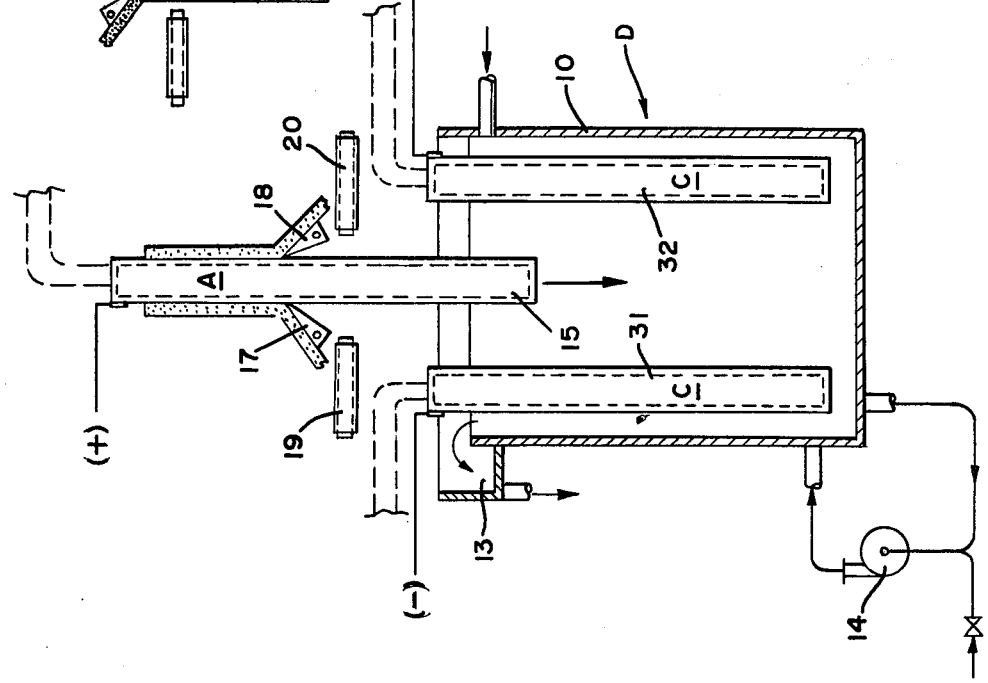
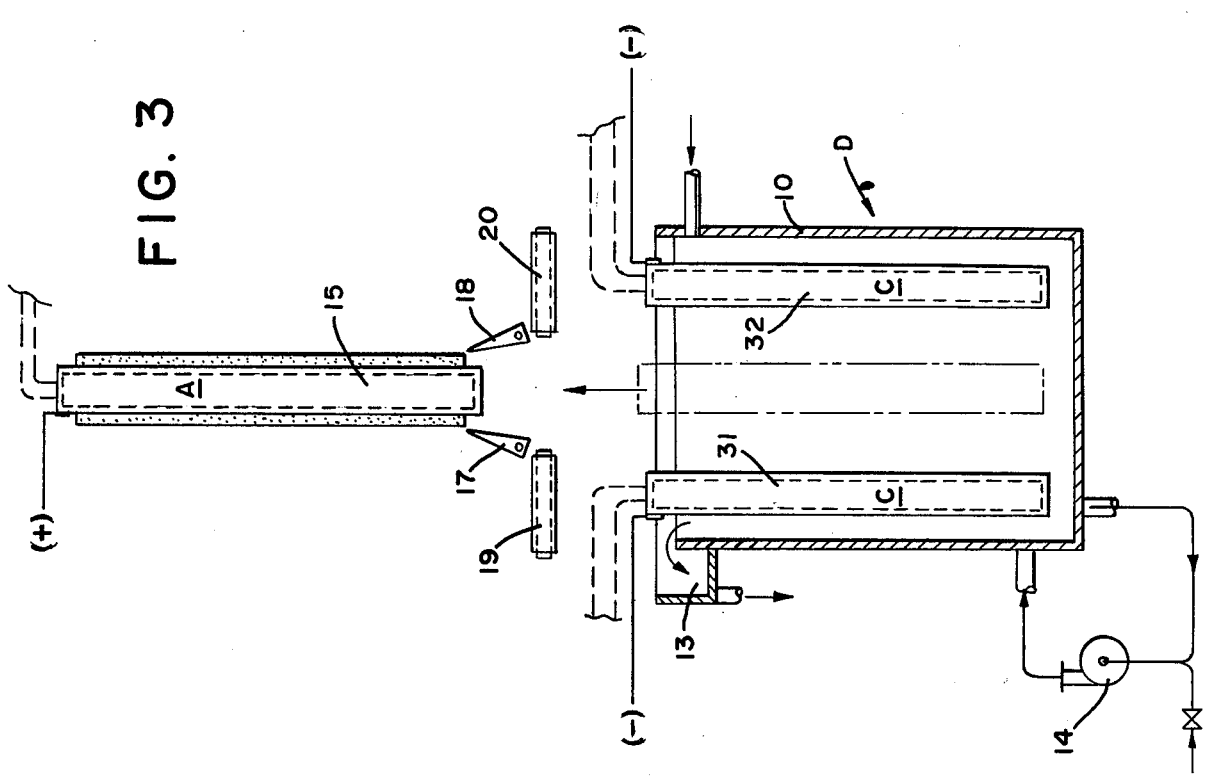

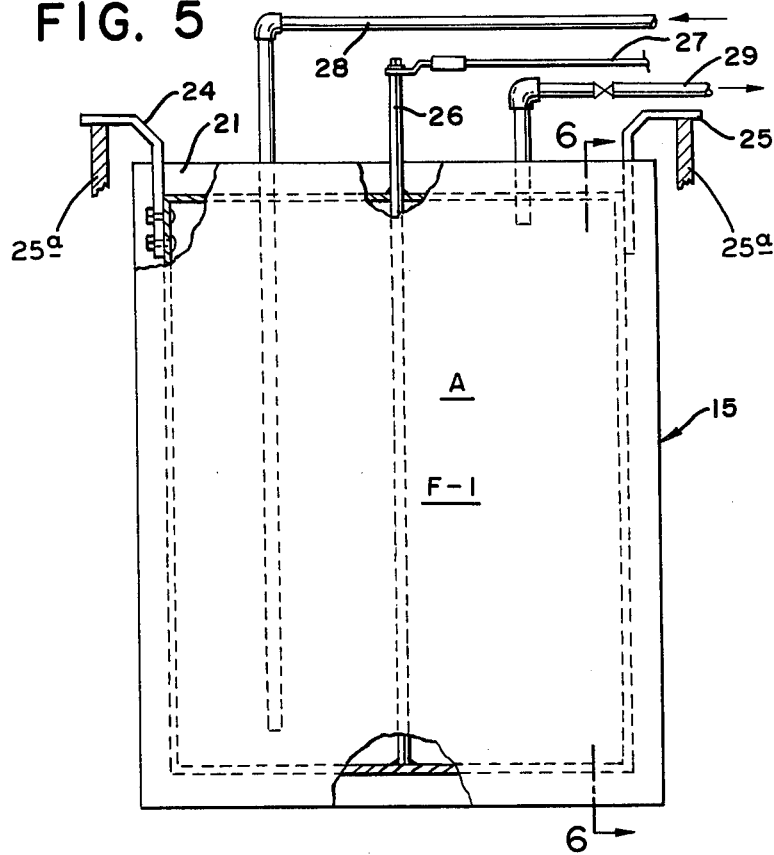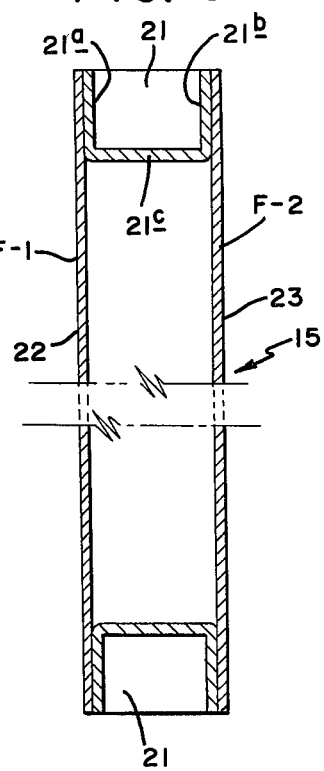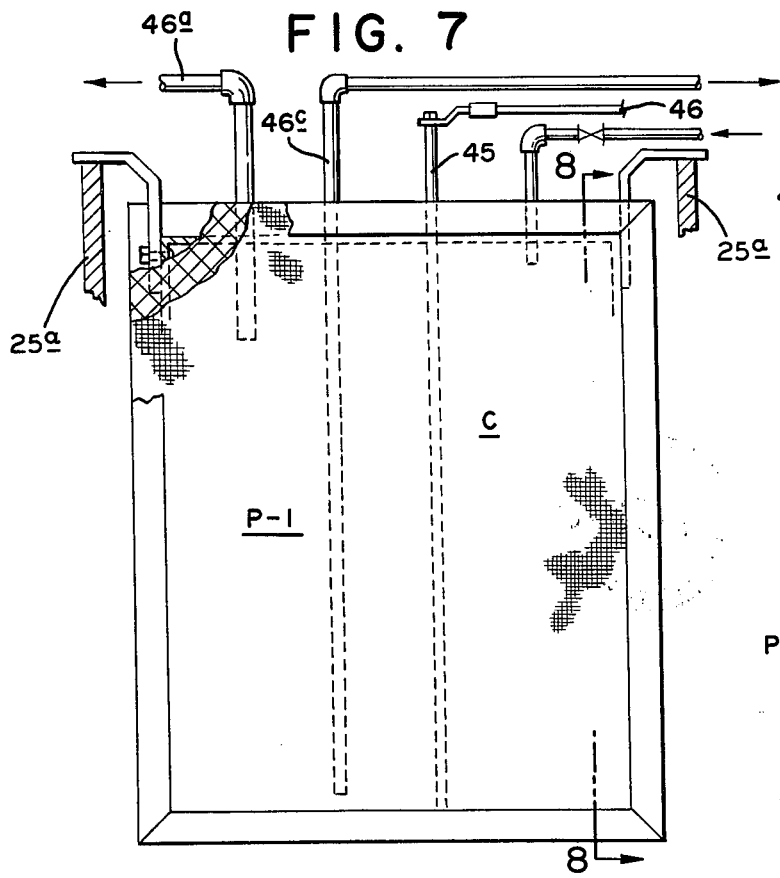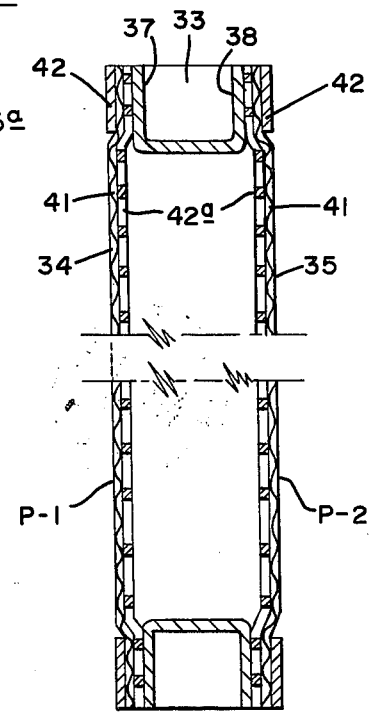

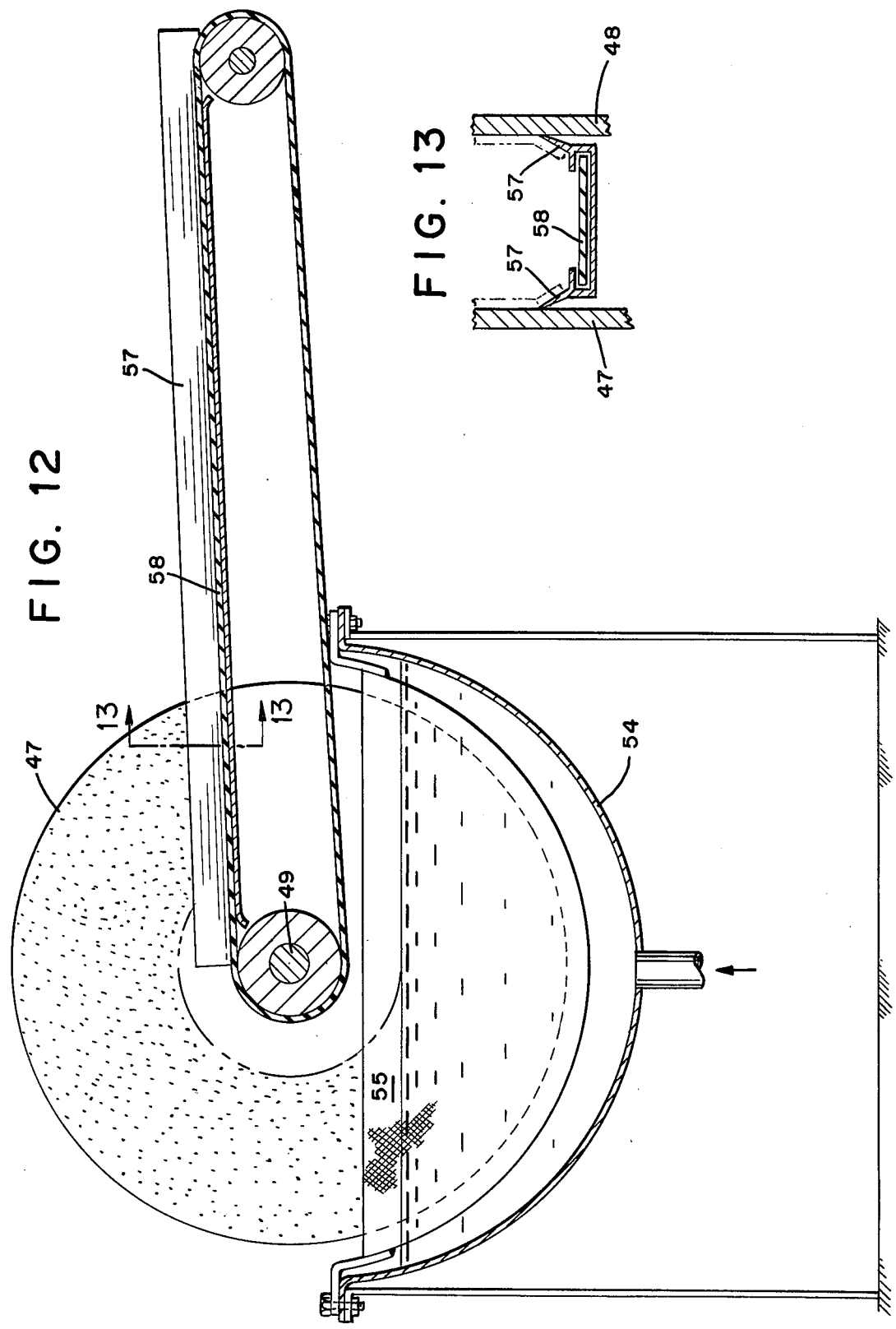

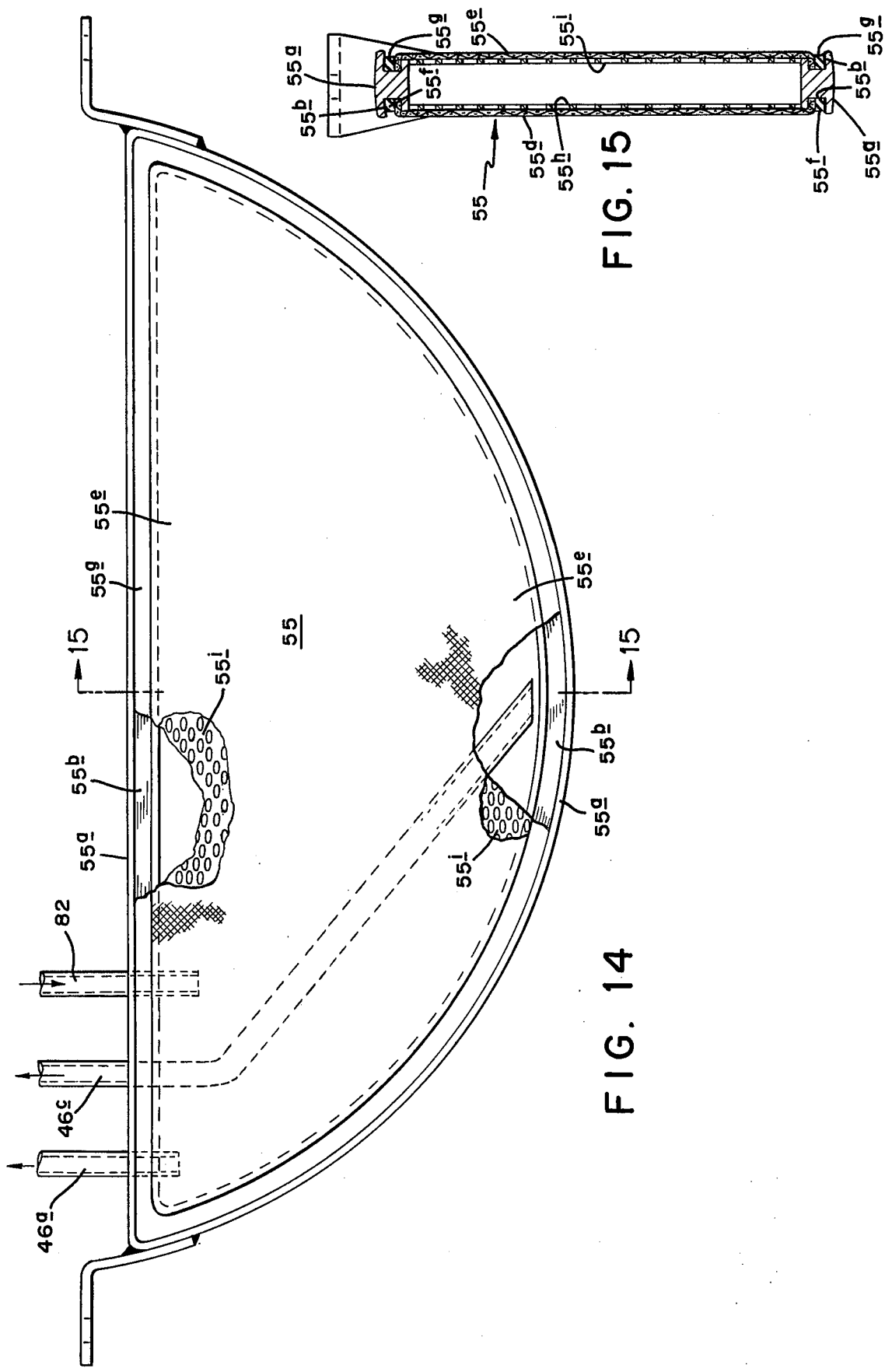

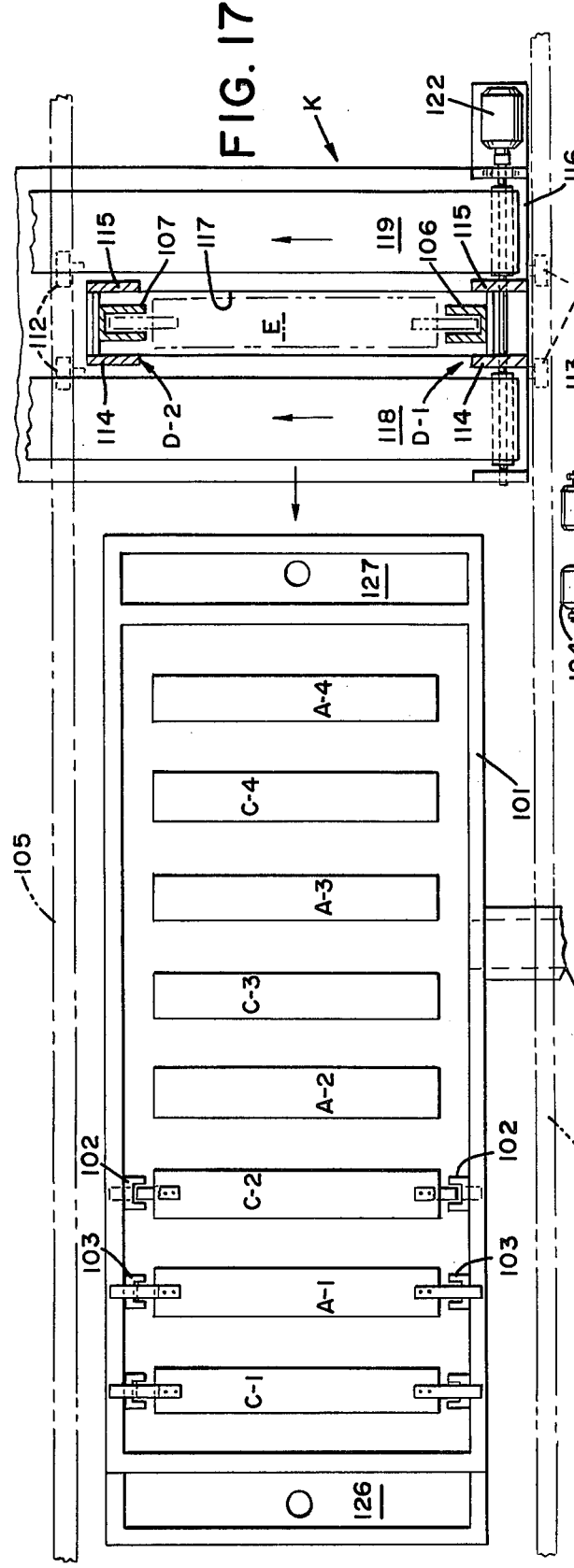
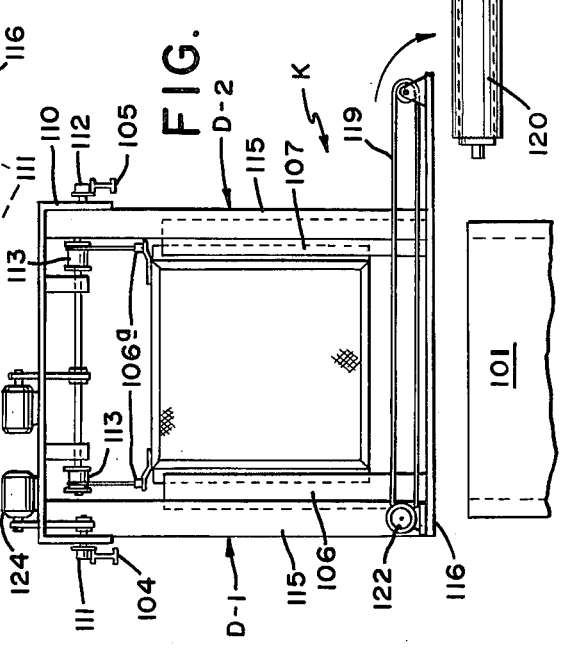
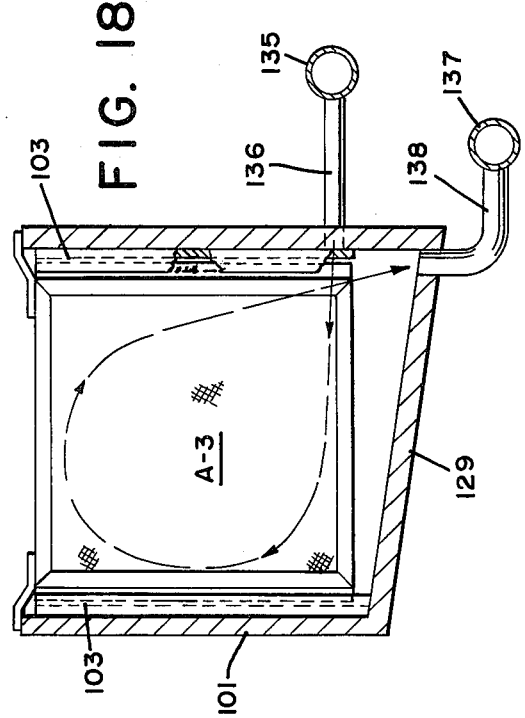
FIG. 17
FIG. 18
FIG. 19

SYSTEM AND METHOD FOR ELECTRIC DEWATERING OF SOLIDS SUSPENSION

This invention relates to the dewatering of suspensions of finely divided or colloidal solids in a carrier liquid, for example a clay suspension, under the influence of an electric field created by passing an electric current through the suspension by means of a pair of spaced live electrodes, a cathode and an anode, submerged in the suspension.

Finely divided solids in suspension may thus be dewatered directly to an extent not attainable as economically and conveniently attainable by conventional dewatering means. Depending upon respective industrial demands, the product thus attainable may be in the form of a cake material or of a slurry of a desired or specified solids concentration.

According to the underlying concept of this invention, under influence of the field, the solids in suspension between the electrodes, and carrying their inherent electric charge which may be either negative or positive depending upon the type or nature of the material, will migrate relative to the carrier liquid towards a respective electrode, a phenomenon known as electrophoresis. As these migrating solids reach the electrode surface, they will collect and settle upon one another in a layer, even as interstitial liquid or water is being further displaced therefrom incident to densification of the solids layer by what is termed electro-osmosis. Eventually, this results in the formation upon the electrode of a recoverable layer of material dewatered and compacted sufficiently to undergo removal from the electrode, for instance during exposure from the suspension. Also the recovery of dewatered solids as a suspension, that is in a still fluid state, is attainable economically directly from the electro-dewatering apparatus at relatively high solids concentration, not otherwise attainable by conventional dewatering apparatus such as cyclones, centrifuges, or filters. At a certain solids concentration thus achievable, the product will meet a special industrial demand. A slurry product of a desired solids concentration is also attainable by blending recovered cake material with feed slurry or with overflow suspension from the treatment tank of the electro-dewatering apparatus.

Simultaneous with the aforementioned electrophoresis effect, the electric current passing through the suspension produces a proportional amount of dissociation of carrier water into hydrogen and alkali at the cathode and oxygen and acid at the anode, the amounts depending upon the controllable density of the electric current.

It is one of the objects of this invention to overcome the shortcomings of prior art electro dewatering systems, by the provision of an improved electrically motivated dewatering system for solids suspensions, capable of delivering a flow of separated carrier liquid at one of the electrodes, while cake material is delivered from the counter electrode.

More specifically, it is one object to provide such an electro dewatering system operating in a manner whereby the carrier liquid and the suspended solids, subject to the energy of the field, move away from each other continuously towards the respective electrodes, for delivery from the system.

It is a further object to provide controls whereby a balanced dewatering operation is maintainable.

The cake product thus obtainable economically, continuously, and uniformly under controlled conditions may be repulped so as to be fluid and pumpable, although of a relatively high solids concentration not otherwise obtainable by conventional dewatering apparatus. An example of the industrial demands is for a well dispersed colloidal clay suspension of about 70% solids concentration for shipment in tank cars, obtainable economically by this invention, as distinct from the demand for a spray dried product in bags or bulk. However, the operation of the electro-dewatering apparatus may also be conducted in a manner whereby a slurry of a desired solids concentration is producible directly in the form of the overflow from the treatment tank.

In order to attain the foregoing objectives, the invention provides a self-contained hollow electrode structure normally submerged in the suspension but bodily removable for inspection. This electrode structure has liquid-pervious wall surfaces, preferably comprising a chemically and electrically neutral filter media or permeable porous membrane backed by a supporting grid which may be part of the electrode structure itself, thus representing a planar electrode surface.

A source of vacuum connected to the interior of the hollow electrode structure provides a controllable pressure differential producing a flow of carrier liquid through the filtration surfaces, while the solids migrate in the opposite direction towards the counter electrode. Filtrate liquid, that is carrier liquid freed of solids may be withdrawn or pumped from the interior of the liquid filled hollow electrode structure at a controllable rate.

A self-contained counter electrode structure collects suspended solids in the form of a layer or a cake on an electrode surface corresponding to that of the opposite liquid permeable surface of the hollow electrode structure in submergence. For the purpose of cake recovery, the counter electrode structure may be raised to a position of emergence from the suspension, with the layer of collected solids or cake layer adhering thereto. Provision is made for the application of cake removal devices constructed and arranged for intercepting the cake material stripped or scraped from the electrode surface during its upward or downward return movement to resubmergence in the suspension. Hence, these devices preferably comprise conveyor means directly cooperating with cake stripping or scraping means, to allow for rapid delivery of the cake material away from the apparatus or treatment tank.

This invention is furthermore concerned with the provision of controls whereby an appropriate or constant rate of filtrate flow through the aforementioned hollow electrode structure is automatically maintainable relative to the rate of migration of the solids in the opposite direction.

For that purpose, one embodiment provides a control system wherein the vacuum applied to the hollow electrode structure is held at a constant value as defined by an intermediate or normal filtrate level held by the vacuum. Any variation occuring in this liquid level, is utilized as a master control or- indicator factor, for correctively adjusting, through relay action, any one or more of certain individual control factors in the system towards restoring the filtrate liquid level. Such factors are the current density, or the filtrate pumping rate, or the vacuum, although the vacuum is surprisingly of but modest influence.

Thus, the electrode current density, or the filtrate pumping rate, or the vacuum could be adjusted towards restoring the filtrate level held by the vacuum, thereby maintaining between the electrodes a desired rate of migration of the solids relative to the counter flow of the carrier liquid.

When utilizing the electric field adjustment for control purposes, increasing the current density will accelerate the rate of migration of the suspension solids towards cake formation, while decreasing the current density will correspondingly slow down the rate of migration of the particles, relative to the movement of the carrier liquid in the opposite direction.

In practical terms, this means that, should the rate of migration of some of the particles be too slow relative to the filtration throughflow rate of carrier liquid, this would allow such lagging particles to settle as a coating on the filter media. This in turn would increase the throughflow resistance of the filter media, producing a corresponding fall in the filtrate level held by the vacuum. This deviation is utilized through the aforementioned relay action, to increase the current density to the extent of reducing the coating on the filter media, and restoring the filtrate level to normal. A similar control limit may be set, whereby an undue lowering of the filtrate level will be translated into a corresponding decrease of the current density with concurrent increase of the coating thickness, until the level is again restored to normal. For practical purposes, the coating may vary as between 1/16 inch and ¼ inch.

Under extreme conditions, for instance where the rate of solids migration is so great that a corresponding filtrate throughflow rate would become excessive, in that situation, the controls may operate in a manner to allow for lagging solids to settle the surface of on the filter media in a very thin layer, thus slightly increasing the throughflow resistance, thus correspondingly lowering the throughflow rate.

A sensitive flow metering device may take the place of the system of the filtrate level responsive devices as one alternative master control device.

Features of the invention reside in various structural or apparatus embodiments constructed and arranged for continuous operation.

In one practical embodiment, the treatment tank receives a continuous feed supply, with overflow means determining the normal level of the body of the suspension in the tank.

In that embodiment, a series or multiplicity of self-contained cathodic and anodic electrode structures arranged in alternation are positioned in mutually spaced relationship in the suspension, with their planar electrode surfaces parallel to one another. The hollow electrodes with the liquid pervious walls deliver the filtrate liquid as above set forth. An overhead traveling carriage is operable to stop at each of the electrode structures where a layer of cake material is ready for removal. The carriage is equipped with hoisting mechanisms for raising such an electrode to a position of emergence. Preferably, the carriage is also unitary with a combination of mechanisms whereby the cake material is stripped from the electrode for instance by means of doctor blades, and intercepted while the electrode is exposed from the suspension, for instance while being lowered back into submergence. The material being stripped is intercepted by conveyor means adapted to carry the material directly away from the treatment tank. The carriage together with its combined hoisting, stripping, and conveyor mechanisms having completed one such cake removal operation, is then moved on to the next electrode awaiting cake removal.

In another apparatus embodiment, rotating disc electrodes are employed, for effecting the formation thereon of the layer of the cake material. The cake layer forms on the lower portion of the disc passing through the feed suspension in the tank. The cake layer adhering to the emerging upper portion of the disc is stripped off and carried away just before that portion re-enters the feed suspension, at the descending side of the disc.

Other features and advantages will hereinafter appear.

In the example of FIGS. 1 to 4 there is shown a sequence of schematic views of the electrically aided dewatering operation according to one embodiment of the invention, including a schematically shown control system; wherein negatively charged solids migrate to the anodic electrode structure, and the resulting cake formation is recovered therefrom, while carrier liquid passes off through the liquid-pervious hollow cathodic electrode structure functionally connected to a filtrate flow control system, and wherein:

FIG. 1 shows the starting condition of the dewatering operation, with incipient cake formation appearing on the electrode surfaces of the respective self-contained electrode structure.

FIG. 2 shows the cake formation completed.

FIG. 3 shows the electrode structure being lifted to emergence for removal of the cake layer, with doctor blades kept in non-stripping position.

FIG. 4 shows the anodic electrode structure being lowered back into the suspension, with the doctor blades positioned for stripping the cake layer onto respective conveyor means.

FIG. 4a illustrates an alternate arrangement for effecting the cake stripping operation.

FIG. 5 is an enlarged detail view, taken on line 5—5 in FIG. 1 of a hollow anodic electrode structure provided with cooling water connections.

FIG. 6 is a vertical sectional view of the anodic electrode structure, taken on line 6—6 in FIG. 5.

FIG. 7 is an enlarged detail view taken on line 7—7 in FIG. 1, of the cathodic electrode structure comprising filter media backed by a supporting grid.

FIG. 8 is a vertical sectional view of the cathodic electrode structure, taken on line 8—8 in FIG. 7.

FIG. 12 is an enlarged vertical sectional view taken on line 12—12 in FIG. 11, showing the shape of the hollow cathodic electrode structure conforming to the shape of the rotating anodic disc electrode with conveyor means provided for continuous delivery of the cake material from the disc.

FIG. 13 is a vertical sectional detail view taken on line 13—13 in FIG. 12 of the cake delivery means.

FIG. 14 is a detail view of the hollow cathodic liquid permeable electrode structure, taken from FIG. 12.

FIG. 15 is a vertical sectional view of the hollow electrode structure, taken on line 15—15 in FIG. 14.

FIG. 17 is a cross-sectional view of the apparatus taken on line 17—17 of FIG. 16.

FIG. 18 is a vertical sectional view of the treatment tank, taken on line 18—18 in FIG. 16.

FIG. 19 is an elevational end view of the apparatus taken on line 19—19 in FIG. 16, showing the cooperation of the hoisting mechanism with the conveyor belts.

Figure 9:
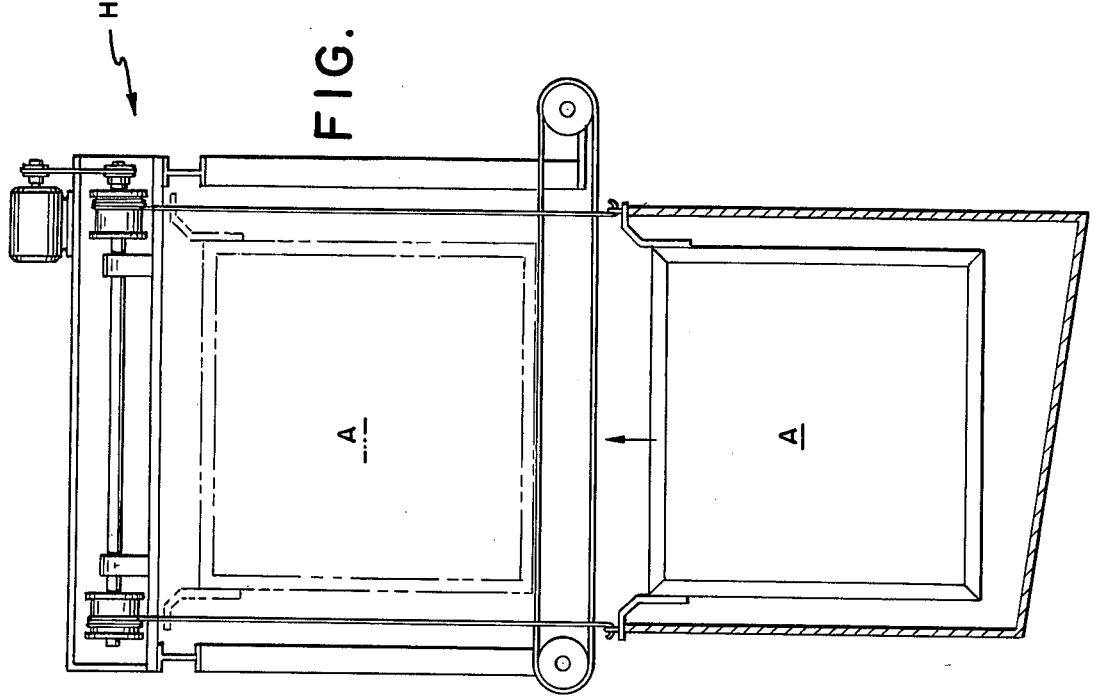
FIG. 9, is a view of the hollow anodic electrode structure similar to FIG. 5, with hoisting means for raising and lowering the same for purpose of cake removal.

In the operation the electro-dewatering system one may encounter suspensions wherein the respective solids may carry predominately either negative or positive charges. The following explanation of the principle of the invention is offered on the assumption of a prevailing negative charge such as carried, for example, by the solids of a clay suspension.

One embodiment of the electro-dewatering system of this invention is illustrated by way of example and schematically in FIGS. 1 to 4.

In this embodiment of the dewatering system, the apparatus comprises the dewatering unit itself along with its structural and mechanical appurtenances, collectively designated by the letter "D", and a filtrate flow control system "S-1" the purpose and function of which will be furthermore set forth below.

The dewatering unit "D" in its relatively simplest form, comprises a tank 10 provided with a supply connection 11 for feeding the suspension to the tank. For the present example, this may be a clay suspension or a suspension of uniformly dispersed finely divided negatively charged solids of colloidal size. The required depth of the body of the suspension in the tank is defined and insured by an overflow edge 12 associated with an overflow receiving launder 13, providing for full submergence of electrode structures in the tank. Accordingly, feed suspension is supplied at a rate such that an excess will continuously overflow from the tank, and so that there will be an everchanging body of the suspension in the tank. Moreover, a circulating pump 14 connected to the tank as at 14a and 14b, keeps the tank contents in motion, thus insuring suitable dispersion of the solids in suspension, and proper and uniform functioning of the cathodic and anodic electrode surfaces exposed to the suspension in the tank.

In this embodiment, the invention provides cathodic and anodic electrode surfaces in the form of self-contained electrode structures of planar configuration, parallel to one another, each being constructed and arranged so that it may be raised vertically in its own plane to a position of emergence from the suspension, and again to be lowered back into the suspension.

On the foregoing premises, that is with suspended solids such as clay carrying a negative charge, a self-contained anodic electrode structure 15 of positive polarity, and preferably of hollow flat box like configuration, occupies the center, alternatively designated by letter "A".

Provision is made for a vertical guide arrangement in order to move this electrode structure vertically in its own plane to a position of emergence from the suspension, and to lower it back into submergence. Also provided are disposal devices whereby cake material formed on the anodic electrode surfaces from the suspension, is stripped and carried away during the downward return movement of the of the electrode structure. In one embodiment, these disposal devices are schematically shown to comprise a pair of symmetrically disposed doctor blades 17 and 18 swingable about their horizontal axes as between neutral position and cake stripping position. The cake material thus being stripped may be carried away by conveying means indicated by respective band conveyors 19 and 20. Yet, by way of reversal, the stripping devices may also be constructed and arranged in a manner whereby the cake stripping and removal is effected incident to the upward movement of the electrode structure to emergence, as illustrated in FIG. 4a.

In greater detail shown in FIGS. 5 and 6, the anodic electrode structure 15 is of a flat box-shaped configuration comprising a rectangular frame member 21 and a pair of solid wall members 22 and 23 sealingly fixed to the flat faces of the respective sides of this frame member. These wall members present electrode surfaces F-1 and F-2 opposite to each other, and adapted for deposit thereon of negatively charged solids from the suspension, as a layer or a cake formation.

In this embodiment, the frame member 21 consists of a U-shaped profile having straight shank positions 21a and 21b interconnected by a transverse body portion 21c.

Fixed to the upper end of frame member 21 is a pair support brackets 24 and 25 for for positioning and supporting the electrode structure in the tank indicated at 25a.

A terminal of positive polarity is provided in the form of vertical rod 26 extending in the interior of this electrode structure, and welded thereto at both ends. The exposed top end portion of this rod has a cable connection 27.

Provision is furthermore made for circulating cooling water through the interior of this electrode structure, as is indicated by inlet connection 28 and outlet connection 29. A cooling water circuit is also indicated in FIGS. 1 to 4 by the showing of a circulating pump 30 and respective connections 30a and 30b. This will carry away any excessive heat from the body of the suspension, generated in the tank due to the operation of the electric field between respective electrode structures.

Furthermore, in this embodiment, the central anodic electrode structure is flanked by a pair of self-contained cathodic counter electrode structures 31 and 32 of negative polarity, and spaced a distance "d" from the anodic center electrode.

These cathodic electrodes alternatively designated by the letter "C", are of a particular hollow construction designed to allow carrier liquid from the surrounding suspension to be drawn through liquid-permeable electrode walls into the interior of this hollow electrode structure, and thence to be drawn or pumped out to disposal. The interior of these cathodic electrode structures communicates with the aforementioned filtrate flow control system "S-1" the purpose, function, and operation of which will be set forth furthermore below.

In greater detail such as shown in FIGS. 7 and 8, these cathodic electrode structures 31 and 32 comprise a rectangular frame 33 similar in size to that of the central anodic electrode structure described above. However, by way of distinction, these hollow cathodic electrode structures have liquid permeable walls 34 and 35 connected to the frame member 33, thus representing filtration areas for the passage therethrough of carrier liquid from the slurry or suspension. For that purpose, the frame member is of outwardly open U-shaped profile adapted to accommodate the attachment thereto of the liquid permeable walls. Each of the liquid permeable walls is an assembly itself comprising a filter media 41 or filter cloth marginally fastened to the frame member as by means of holding strips 42.

Each of the filter media is backed against external pressure by a supporting grid 42a fixed or welded marginally to the surrounding frame member. These backup grids thus constitute part of the electrode structures, each representing a respective electrode face. With the grids and the filter media thus connected to the frame member, these electrode structures thus represent unobstructed planar faces P-1 and P-2.

Furthermore, these cathodic electrode structures 31 and 32 each have a terminal rod 45 similar to that of the above described anodic electrode structure, with an electric cable connection 46 to provide the required polarity.

As indicated in FIGS. 1 to 4, these cathodic electrode structures all communicate with the aforementioned filtrate flow control system "S-1" whereby a pump 45a applies vacuum to the interior of these cathodic electrode structures by a connection 46a causing carrier liquid from the surrounding suspension or slurry to be drawn through the filter media, thus continuously filling the interior of the cathode structures, even as a pump 46b withdraws filtered carrier liquid from the interior through line 46c at a correspondingly balanced rate.

Assuming now that the dewatering operation is in balance, with the control system "S-1" effective to maintain a uniform filtration throughflow rate of carrier liquid through these cathodic electrodes, the operating cycle of the dewatering unit according to FIGS. 1 to 4 is as follows:

A slurry or suspension, for example a clay suspension, is supplied to the treatment tank continuously through inlet connections 11 at a rate sufficient to insure an excess to overflow continuously into receiving launder 13. This insures for the electrode structures to have their effective electrode surfaces fully submerged in this suspension while in operation.

Thus, the electric field effective between respective electrodes, in the case of a clay suspension, will cause negatively charged colloidal clay particles to migrate relative to the carrier liquid towards the anodic electrode structure alternatively designated by the letter "A". Simultaneously, carrier liquid moves in the opposite direction, and then filtered through the hollow cathodic electrode structures discharges from the treatment system.

Accordingly, the FIG. 1 starting condition of the dewatering operation shows incipient formation of a cake layer on the anodic electrode surfaces, consisting of clay particles that have reached, and are now adhering to, the anode surface under the influence of the electric field.

At this time, the scrapers or doctor blades 17 and 18 are in neutral position, that is to say swung away from each other, in order to allow for subsequent upward passage between them of the anode structure when being raised for cake discharge.

FIG. 2 shows the layer of cake formation "O" completed with the doctor blades still in neutral position to allow the cake carrying anode structure to be raised to a position of complete emergence such as illustrated in FIG. 3.

As the anode structure reaches its uppermost emergened position, the doctor blades are swung towards each other to cake stripping position preparatory to the next following downward return movement of the anode structure, illustrated as in FIG. 4. Thus, the cake layer is being stripped and delivered directly onto the band conveyors 19 and 20. The end of this downward return movement restores the system to the starting condition, and the doctor blades to neutral position, for a renewal of the operating cycle.

FIG. 9 schematically illustrates hoisting means collectively designated "H" for raising and lowering of the anodic electrode structure incident to the cake stripping operation described above.

As initially indicated, the slurry or suspension to be thus dewatered, may be of the kind wherein the suspended solids carry a predominantely positive electric charge. In that case, under the influence of the electric field, these solids will migrate towards the negative polarity of a cathodic electrode structure. Simultaneously carrier liquid is being filtered and withdrawn through the hollow anodic electrode structures having the above described liquid permeable walls, and communicating with the above described control system "S-1" that regulates the filtrate through flow rate.

Figure 10:
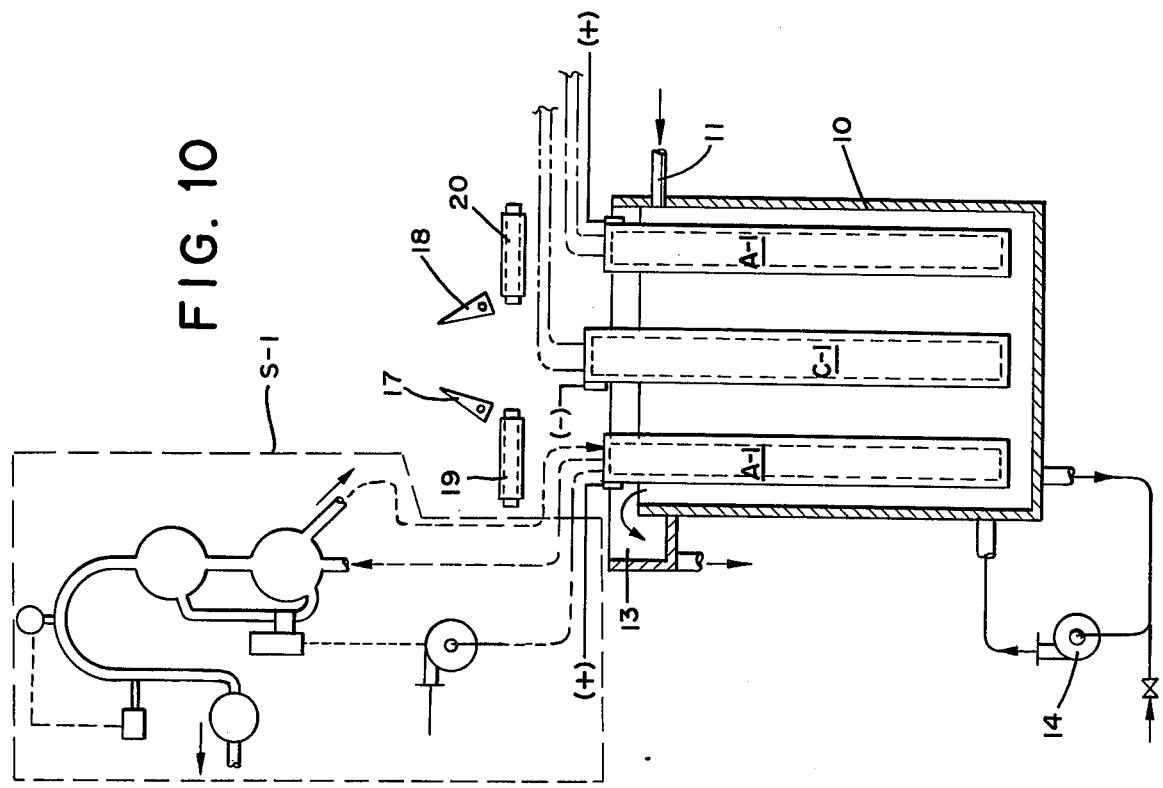
FIG. 10 is a view similar in appearance to the embodiment of FIGS. 1 to 4 including the control system, but functionally arranged for handling suspension solids carrying a positive electric charge.

Such an alternate operating condition as represented in FIG. 10, requires only to change polarities of the respective electrode structures in such a manner that the center electrode structure "A" now becomes a cathode designated as "C-1", while the two flanking cathode structures "C" now become anodes designated as "A-1".

Otherwise, the operating cycle is comparable to that described above relative to FIGS. 1 to 4, in that the central cathodic electrode structures C-1 can be raised and lowered for the cake stripping operation, while filtered carrier liquid is pumped from the interior of the two flanking anodic electrode structures "A-1" and "A-2" by the control system "S-1" at a regulated rate.

FIG. 4a illustrated an alternative arrangement whereby the cake stripping itself is effected during the upward movement of emergence of the electrode structure instead of during the downward return movement of resubmergence as illustrated in FIGS. 1 to 4.

While this arrangement is largely self explanatory, it will be seen that the scraper blades now pointing downwardly instead of upwardly, will strip the cake material during upward movement of the electrode structure, while the blades may be held in resiliently yieldable sliding contact with the electrode structure. As a matter of simplification, this sliding contact may be maintained even during the subsequent downward movement of the electrode structure now cleared of the cake material. Otherwise, a blade actuating mechanism may be employed similar to the outlined above in connection with FIGS. 1 to 4.

Another embodiment of the underlying principle of this invention is illustrated in the construction shown in FIGS. 11 through 15.

This embodiment is based on the concept of an electrodewatering apparatus employing a disc electrode rotating about an horizontal axis. The lower portion or roughly half of the electrode surface of the disc is immersed in the suspension in the treatment tank which also contains submerged the stationary counter electrode structure positioned in cooperative relationship with the sumberged portion of the disc.

The submerged cathodic counter electrode is comparable structurally and functionally to the hollow cathodic electrode structure of the FIG. 1 embodiment, in that it has liquid permeable filtration walls, and that it communicates with filtrate throughflow control system "S-2" similar to the one designated "S-1" in FIG. 1.

The cake material collected on the submerged lower portion of the disc is continuously stripped from the upper portion thereof incident to the continuous rotation of the disc, and allowed to drop directly onto band conveyer means which carry the cake material away from the tank.

Figure 11:
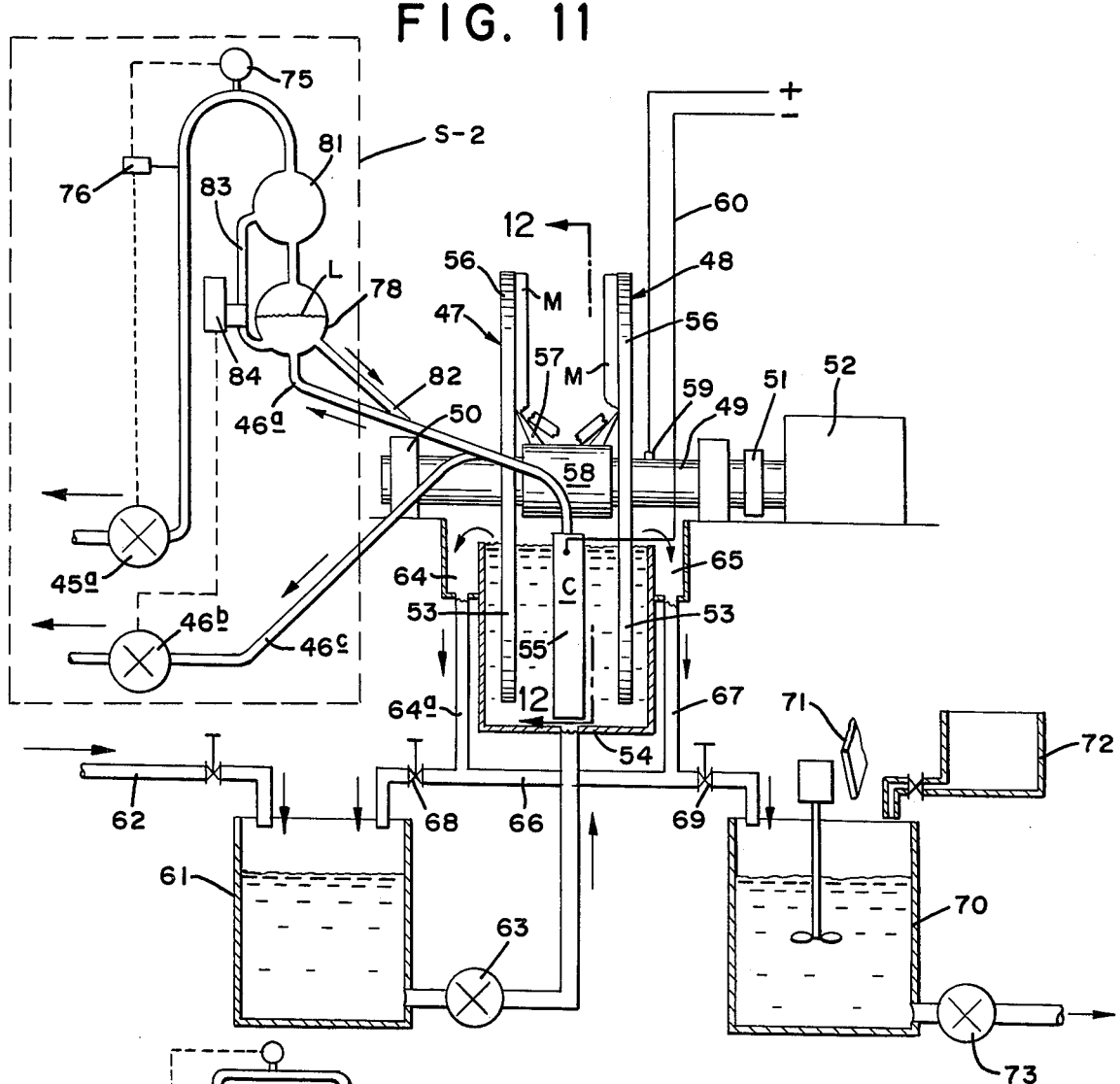
FIG. 11 is a schematic view of another embodiment of the invention, designed for continuous operation of a rotating partially submerged anodic disc electrode structure co-operating with a submerged self-contained hollow liquid pervious cathodic electrode structure functionally connected to a filtrate flow control system.
Figure 11A:
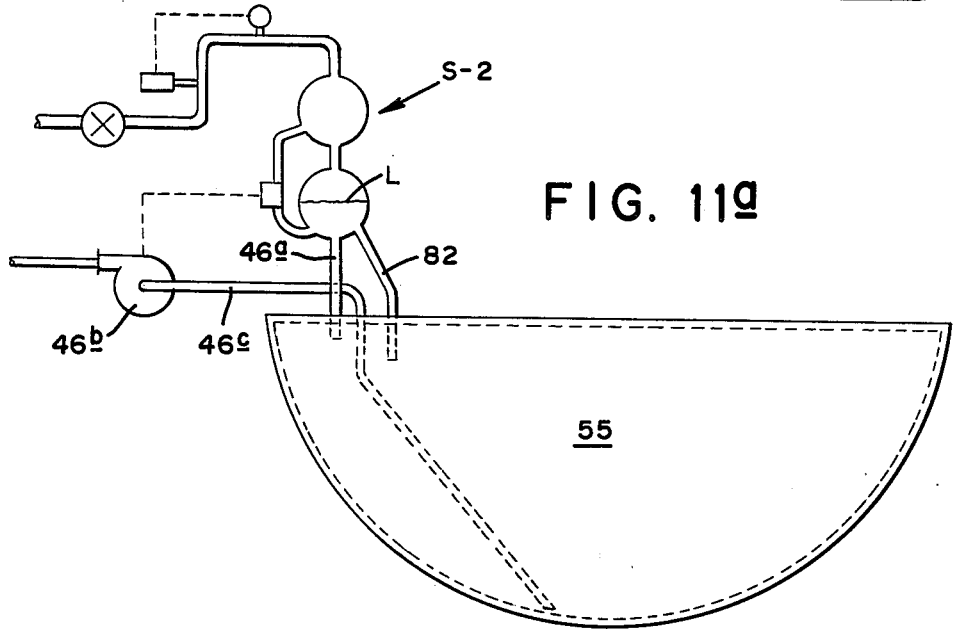
FIG. 11a is a detail view taken from FIG. 11, of the filtrate flow control system of FIG. 11.

In the schematic views of FIGS. 11 and 11a, this embodiment of this electro-dewatering apparatus comprises a pair of anodic disc electrodes 47 and 48 mounted on shaft 49 supported in bearings 50 and 51, and rotated by a reduction gear motor 52, at a speed appropriate for this dewatering operation.

The lower portion 53 of these discs during rotation is submerged in the suspension contained in treatment tank 54. A hollow cathodic electrode structure 55 (see also detail FIGS. 12 to 15 below), having liquid permeable walls such as previously described, is functionally interposed between the submerged portions of the two anodic disc electrodes. Thus, under the influence of the electric field effective between the electrodes, the solids from the suspension will collect on the submerged disc portions to emerge as a layer or as a thickness of cake material "M" from the suspension for removal from the upper portion 56 of the discs incident to rotation. Continuous cake removal devices for that purpose are indicated to comprise cake stripping or scraping means 57 cooperating with a band conveyer 58 (see also detail FIGS. 12 and 13) for intercepting and removing the stripped material.

Again, as previously described, in connection with the embodiment of FIGS. 1 to 8, carrier liquid is filtered through the hollow cathodic electrode structure 55 at a controlled rate under the influence of vacuum provided by control system "S-2" which through a line 46a communicates with the interior of electrode structure 55.

A sliding contact 59 provides the required positive polarity at the anodic disc electrodes, while terminal conduit 60 provides negative polarity at the hollow cathodic electrode structure 55.

As seen from FIGS. 14 and 15, the cathode structure 55 comprises a frame member 55a of substantially half-round configuration formed along the periphery which lateral grooves 55b. These grooves serve to fasten to both sides of this frame the filter media or filter cloth 55d and 55e respectively, by means of tucked in rubber sealing strips 55f and 55g respectively. The filter media are backed by grids 55h and 55i respectively. These grids being welded to the frame 55a again constitute electrode surfaces.

Schematically, in this embodiment, feed suspension is supplied to a holding tank 61 from supply conduit 62. A pump 63 feeds this suspension to the treatment tank 54 at a rate to insure that an excess will overflow from the tank into receiving launders 64 and 65. From launder 64 a downcomer pipe 64a leads to an horizontal header 66. From launder 65 a downcomer pipe 67 also connects with horizontal header 66. With control valves 68 and 69 provided in the respective outer end portions of the horizontal header, excess overflowing feed slurry or suspension may be sent optionally back to holding tank 61, or else to a mixing or blending tank 70.

The dewatered and recovered cake material is indicated at 71. In the embodiment of FIG. 11, to meet industrial demand for a prepared liquid-clay mixture of a predetermined relatively high yet fluid pumpable solids concentration the dewatered cake material 71 is delivered to mixing tank 70, while also admitting feed slurry, or overflow suspension from launder 65 through valve 69, at a controlled rate such as to attain the required solids concentration. The addition of a dispersing agent is indicated by a supply container 72. A pump 73 may deliver the thus prepared homogenized slurry or colloidal suspension to storage or to a tank car or the like.

Yet, the dewatering operation for this purpose may also be conducted in a manner whereby a slurry product having a solids concentration to meet market requirements is attainable directly in the form of slurry overflowing from the treatment tank.

Through the electro dewatering system of this invention, a thus qualified industrial slurry is producible continuously and economically. By way of contrast, it is noted that for other industrial purposes, a supply of thin clay slurry is subjected to a spray drying operation which produces a powdered clay material or the like, as may be shipped in bags or in bulk.

On the other hand, a marketable slurry had to be prepared by admixing to a thin slurry an amount of the dry powder product sufficient to attain the specified solids concentration.

There now follows a description of the filtrate flow control system "S-1" or "S-2" shown to be common to both of the foregoing apparatus embodiments of FIGS. 1 and 11 of the invention, and marked by the broken line surrounding it. For the sake of explanation it is assumed that the suspension thus to be dewatered be of the kind where the particles carry a negative charge, as is the case with a clay suspension.

In these controls, the invention may utilize an interrelationship that exists as between the applied and controllable current density causing the electric field, and the rate of migration of the suspended solids towards the anodic electrodes relative to the rate of movement of carrier liquid in the opposite direction towards and through the counter electrodes. That is to say, increasing the current density will correspondingly increase the relative velocity of the suspended solids towards the anode, and vice versa. Thus, a degree of blinding of the filter media of the cathode structure may be either discouraged or encouraged by respective changes of the current density. Hence, a respective lowered field density, will allow some suspended particles to settle on the filter media.

In cases where an increase in current density may be such that no coat is formed on the filter media, due to the relatively higher induced speed of migration of the particles away from the filter media, that condition may be compensated for by an increase of the vacuum.

On the other hand, the filtrate pumping rate and the suspension feed rate may be varied relative to one another, in order to obtain the desired filtrate flow control effect.

In the simplified form presented schematically by this example, the principle of this control system "S-1" or "S-2" is as follows:

According to one mode of operation, constant vacuum is applied to the interior of the hollow cathodic electrode structure by vacuum pump 45a. A vacuum gauge 75 through relay device 76 may control the operation of the vacuum pump, for maintaining the vacuum at a desired constant value.

While the vacuum causes carrier liquid from the suspension to be filtered through the liquid permeable walls of the cathodic electrode structure, the pump 46b draws filtrate liquid from the cathodic electrode structures, pitted against the opposite force of the vacuum. As a governing control factor a filtrate level "L" is maintained by the vacuum in separating chamber 78 which communicates through pipe 46a with the interior of the electrode structure. Since this pipe terminates downwardly at the upper end of the electrode structure, it will draw a mixture of liquid and $H_2$-gas electrolytically generated at the cathode, into vacuum separation chamber 78 where the visible vacuum liquid level "L" is to be maintained. Gas is drawn off upwardly through a secondary separating chamber 81, while degassed filtrate is shown to gravitate back into the cathode structure as through a pipe 82. Parallel communication between the two chambers 78 and 81 is provided in a bypass connection 83 wherein the vacuum filtrate level "L" is undisturbed by bubbling or ebullition that may exist in separating chamber 78.

Relay device 84 responsive to excessive changes in the filtrate level "L", will adjust the filtrate pumping rate or output of pump 46b, so as to bring the filtrate level back into its normal range of admissible relatively minor fluctuations.

In rare cases when no coat is formed on the filter media of the cathode structure, should the throughflow resistance of the filter media increase, then the control system will increase the vacuum.

Balanced operation in turn requires that the rate of filtrate flow through the cathodic electrode should be adequate, but not so great as to hamper or interfere with the migration of the suspended negatively charged solids in the opposite direction towards the anodic electrode.

Yet, as above set forth for control purposes, the level responsive master control device 84 may relay its control impulses to vary the current density or electric potential applied to the electrodes, while maintaining an appropriate predetermined constant pumping rate along with a constant vacuum.

Figure 11B:
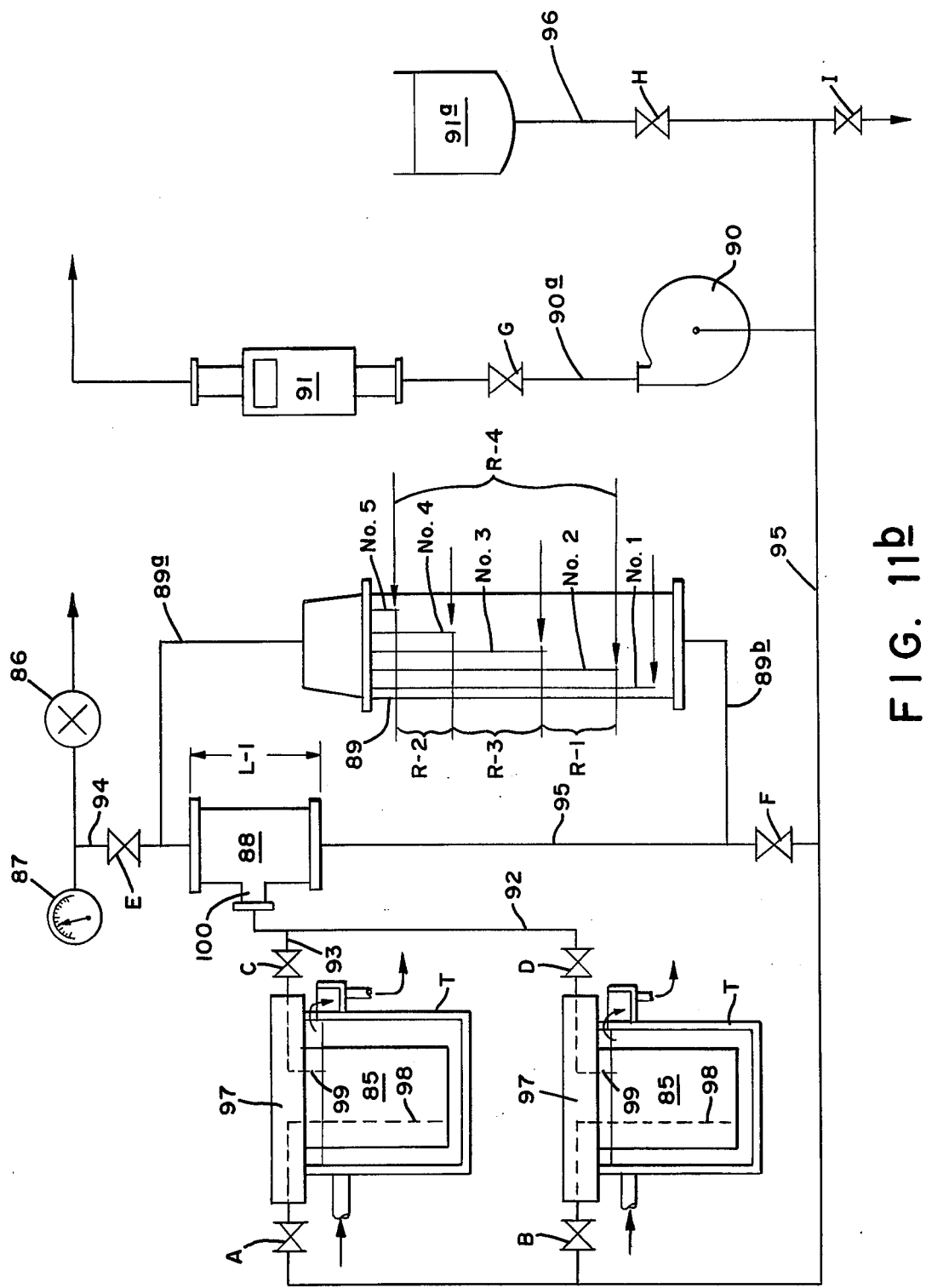
FIG. 11b shows another form of the filtrate flow control system which controls the filtrate flow by adjustment of the current density of the electric field.

A more fully implemented filtrate flow control system is represented in FIG. 11b, whereby any one of the foregoing optional control functions may be exercised. However, in the present example, reference will be made to control via corrective changes of the current density caused by the electric field, and for a suspension containing predominantly negatively charged solid or colloidal particles.

This control system is composed of the following main elements:

(1) One or more hollow cathodic electrode structures 85 (two being shown), having liquid pervious walls subject to vacuum filtration, substantially as described above, suspended in the treatment tank "T".

(2) A vacuum pump 86 connected to the interior of the cathodic electrode structure.

(3) A vacuum gauge 87.

(4) A vacuum receiver 88 for degassing the filtrate flowing from the cathode structures.

(5) A vacuum filtrate level detection device 89 (herein also termed the Reservoir Level Detection Device), connected in parallel communication with the vacuum receiver 88, as indicated by pipe connections 89a and 89b.

(6) A filtrate pump 90, its intake side connected to the vacuum receiver 88, and thus also to the level detection device 89.

(7) A flow controller or flow control valve "G" located in the pump discharge line 90a, manually operable for setting a constant filtrate pump discharge rate.

(8) A flow meter 91 indicating the filtrate discharge rate.

(9) A dump tank 91a provided for holding a supply of start-up liquid sufficient to fill the system.

Other manually operable valves in this Control System comprise:

(a) Valves "C" and "D" located in the vacuum suction lines 92 and 93 between the cathode structures and the vacuum receiver 88.

(b) Valve "E" located in the vacuum suction line 94 between the vacuum pump 86 and receiver 88.

(c) Valve "F" located in the filtrate pump intake line 95 between this pump and the vacuum receiver 88.

(d) Valve "H" located in the connecting line 96 between the dump tank 91a and the intake side of filtrate pump 90.

(e) Valve "I" is a drain valve for dump tank 91.

The hollow cathode structures 85 are suspended each from its horizontal beam 97 into the bath of slurry in the treatment tank, so that the filter medium is fully submerged for dewatering of what may be a clay suspension also termed "Clay Slip".

Two pipes 98 and 99 extend into the hollow space of each vertically positioned cathodic electrode structure 85 or cathode filter leaf. The long pipes 98 extending almost to the bottom of the cathode filter leaves, are served by valves "A" and "B", while the short pipes 99 terminating at the top end of the cathode structures, are served by valves "C" and "D".

The vacuum receiver 88 may be simply in the form of a vertical length of pipe "L-1", to serve as a gas separating chamber, provided with a lateral suction inlet connection 100. As the liquid-gas mixture, in this instance a mixture of filtrate liquid and $H_2$-gas generated at the cathode, enters the separating chamber from the side, the liquid falls by gravity through line 95 to the bottom as represented by the intake side of filtrate pump 90, to be pumped away at an adjusted constant rate such as will be furthermore explained.

The filtrate pump that removes the filtrate from the receiver 88, may be a conventional motor driven centrifugal pump driven at a constant speed. This then pumps the largely gas-freed filtrate liquid through the flow meter 91 which may be for example of the so-called "Rotameter" type.

The flow of filtrate from the pump, that is the pump discharge rate, can be set manually by adjusting the control valve "G" to any desired position as between "full open" and "full closed". Once this setting has been made, the filtrate pump discharge rate remains constant.

The flow of filtrate from the cathode structures through the vacuum receiver 88 is controlled by means of the Reservoir Level Detection Device 89. As the filtrate level in this reservoir changes in the course of operation, it will through suitable relay devices, correspondingly change the electric current or current density applied to the electrode structures, thereby controlling the flow of filtrate through the filter media into the hollow interior of the cathode structures, this in a manner furthermore to be described.

The cylindrical transparent reservoir 89 of the level detection device, is connected in parallel to the vacuum receiver 88 by means of piping 89a and 89b in such a way that the flow of filtrate liquid from the vacuum receiver to the pump does not pass through the reservoir 89. This arrangement is provided to prevent disturbance of the vacuum-held filtrate level in the reservoir, thus to enable accurate level measurements to be made, inasmuch as such measurements represent the master control factor in the operation of this embodiment of the control system.

These filtrate level measurements may be accomplished by means of a number of electrically conducting probes or vertical rods extending downward through the top end of the reservoir in sealed relationship therewith. These probes being of different lengths determine between them various control ranges in connection with the rise or fall of the liquid level in the reservoir.

In the present embodiment, there are five probes, namely a common probe No. 1, and differential probes No. 2, 3, 4 and 5 which detect the level of the filtrate or current conducting liquid, as it rises so as to complete respective circuits, or falls so as to break respective circuits, as between common probe No. 1 and any of the differential probes No. 2 through No. 5.

These probes of themselves and the associated relay devices and electrical components herein to be used to detect the filtrate level and accordingly to monitor the filtrate flow control devices, may be in the nature of commonly available commercial products.

The probes can be made of any desired length to suit requirements of the present electro dewatering operation. In a practical embodiment, and for the present purpose, the reservoir may consist of a 3 inch diameter transparent pipe 36 inches long. In the present example, the length of the aforementioned five probes No. 1 through No. 5 extending down into the reservoir, are 2 inches, 12 inches, 22 inches, 32 inches, and 34 inches respectively.

From a control standpoint, a change of the liquid level in the reservoir is a measure of the difference between the filtrate flow from the cathode structures, and the flow of liquid to the filtrate pump, which difference thus may be a criterion of a change in through flow resistance of the filter media or liquid permeable walls of the cathode structures.

Thus, a rise of the liquid level in the reservoir indicates that more liquid is flowing from the cathode structures than is being pumped away. Conversely, a fall of the reservoir level indicates that more liquid is being pumped away than is flowing from the cathode structures.

Hence, the object and function of this control system is to balance the flow of filtrate from the cathode structures, with the flow of filtrate going to the pump. That balance is achieved by maintaining the liquid level in the reservoir between predetermined upper and lower limit points as defined by the distance R-4 between the lower ends of probes No. 2 and No. 5, According to the foregoing example, these limit points are 30 inches apart.

There follows an explanation of the reasons for fluctuations occurring in through flow resistance of the filter media with corresponding changes of the throughflow rate and therefore also of the filtrate level in reservoir. The control system in this embodiment utilizes such level changes or fluctuations for correctively influencing the filtration throughflow rate, up or down, in such a manner as to maintain a uniform or regulated dewatering operation.

As initially indicated, and according to one embodiment, the function of the filtrate flow control system is in response to changes in the mobility or rate of movement towards the anode structure of the negatively charged suspended particles, relative to the movement of the carrier liquid in the opposite direction. With the rate of movement of the particles being dependent upon the amount of electric current applied to the electrodes, an increase of current will speed up the particles towards the anode, while a decrease of the current will effect their retardation.

Hence, if an undue fall in the filtrate level occurs in the aforementioned reservoir due to increase in filter throughflow resistance, a corresponding increase of filter throughflow resistance occurs due to some lagging particles settling as a coating on the filter media, resulting in a fall of the liquid level below normal in the reservoir. That condition may be corrected by increasing the electric current applied to the electrodes, thus speeding up the particles towards the anode structure sufficiently to clear the filter media to the point where normal filtrate throughflow is restored.

Conversely, excessive filtrate flow through the cathode structure, with a resulting rise of the liquid level in the reservoir and consequent diminishing of the coating on the filter media will be corrected by a corresponding decrease of the current to attain the aforementioned balanced filtrate throughflow rate conditions.

Attaining that balance is a means for effectively maintaining the dewatering function through the hollow cathode structure as well as the cake formation on the anode structure.

Based upon the foregoing explanations, there follows a description of the start-up and operation of the filtrate flow control system of FIG. 11b, in terms of controlling the liquid level in the reservoir.

To control the liquid level, first the filtrate flow out of the reservoir is set normally at a substantially predeterminable rate, by the setting of the control valve "G". With the flow of filtrate into the reservoir being a function of the current applied to the electrodes, there are chosen two currents that can be applied during normal dewatering operation, namely a "high" and a "low". These are set manually. The "high" current is set to allow for a filtrate flow into the reservoir greater than that being pumped out, a condition causing a rise in the liquid level. The "low" current is set to result in a filtrate flow into the reservoir less than that being pumped out, and therefore the liquid level falls.

If the liquid level appears between probe end points No. 2 and No. 3, designated as the lower range "R-1", the associated relay system will automatically apply the "high" current to the electrodes, causing the liquid level to rise. If this liquid level appears between probe end points No. 4 and No. 5, designated as the upper range "R-2", then the "low" current will automatically apply to the electrodes, causing the liquid level to fall.

If the liquid level appears between probe end points No. 3 and No. 4, designated as the intermediate range "R-3", the current will remain at whatever setting was in effect before the liquid level reached that intermediate zone. This therefore is a "dead" or "slack" zone functioning as a buffer zone designed to prevent momentary fluctuations of current, if the liquid level should become momentarily disturbed as by splashing or erratic filtrate flow conditions.

Safety cutouts are provided, for automatically shutting down the dewatering operation, in case of the occurrence of extreme upper and lower filtrate flow conditions, that lie beyond the practical limits of the controls. Accordingly, if the liquid level rises to probe end point No. 5 of the upper end of range "R-2", or else falls to probe end point No. 2 at the lower end of range "R-1", the power to the electrodes structures and to the filtrate pump 90 is automatically turned off.

Under practical conditions, the above mentioned "high" and the "low" settings of the current are within 5% to 10% of the nominal current required for given dewatering conditions and apparatus function. For example, if the nominal current is 360 amps, the "low" setting may be 340 amps, while the "high" setting would be 380 amps.

In a prototype of the apparatus embodying the invention, with the nominal current of 360 amps applied to the electrodes, the corresponding nominal outflow of filtrate was about 23 gallons per hour, varying as between 22 and 24 gallons per hour, when operating within the range of the above mentioned "high" and "low" current settings. With the filtrate pump set for the nominal pump discharge rate or design rate, the liquid level in the reservoir fluctuated between the probe end points No. 3 and No. 4 (i.e. the intermediate range "R-3") two times per hour.

In this example of prototype performance, the device was fed at 100 gallons per hour of slurry containing 60% clay solids. The final product slurry previously mentioned, contained 70% solids and exited the system at 77 gallons per hour.

While the filtrate flow indications are the master control factor in terms of the above described liquid level variations or other substitute indicators responsive to variations in filtrate flow, there are other control alternatives. For example, instead of varying the current flowing across the electrodes, the flow of filtrate liquid from the hollow electrode could be controlled by varying the vacuum applied to the system, that is in such occurrences where no coating is formed on the filter media of the cathode structure. Also, instead of controlling the flow of filtrate from the cathode structure, it could be held fixed while the filtrate pump could be controlled in a manner to compensate for liquid level variations in the reservoir.

However, it will be understood that for any of the foregoing control alternatives, in selecting the rate at which filtrate is to be pumped out of the reservoir, that rate should not be higher than filtrate can be made to flow into and from the hollow electrode structure at the "high" current setting. Otherwise it would fault the control system.

Similarly, if the filtrate pumping rate is set lower than the rate at which filtrate liquid flows from the hollow electrode structure at the "low" current setting, such a condition too would fault the controls.

The setting of the filtrate pumping rate therefore will be coordinated to the operating range of the controls, so that all control factors will operate in the proper relationship to one another.

Thus, preliminary to the starting up of the operation of the dewatering system as such under the above described controls via the electrode current, manual setting is required of the "high" and the "low" current, as well as of the filtrate pumping rate, all relative to one another. In the present embodiment, visual reference to the liquid level in the control reservoir is required when these settings are made, in order to insure that neither of the above fault conditions will occur.

Assuming, again the example of the clay suspension with its negatively charged clay particles, the starting sequence of preliminary steps requires that the hollow cathode structures be fixed in place, the treatment tank be filled with the clay suspension, and the dump tank 91 be filled with filtrate liquid or water sufficient to fill the cathodic electrode system.

The system is filled by applying vacuum to the cathode structures through valves "C" and "D", such that liquid is drawn from dump tank 91 and through valves "A" and "B". When the cathode structures are filled as indicated by a flow of liquid into the receiver 88, valves "A" and "B" are closed and the dump tank is isolated from the system by closing valve "H".

The dewatering operation itself is then started by applying power to the electrode structures causing liquid to flow through the cathode structures under the applied vacuum, and to the reservoir. Valve "F" is then opened and the filtrate pump is turned on and its discharge rate adjusted by throttling valve "G" so as to maintain a relatively constant intermediate liquid level in the reservoir. A flow meter such as the so-called "Rotameter" will indicate and monitor the pump discharge rate.

The aforementioned "high" and "low" power level are then adjusted so that the filtrate level in the reservoir rises at the "high" power setting, and the level falls at the "low" power setting.

Automatic operation proceeds from this point.

The operation of the dewatering system is stopped by turning the power to the electrodes off, and opening valves "A" and "B" so that the liquid inside the cathode structures can be pumped out. When the cathode structures are empty as indicated by no pump output, the vacuum is turned off, and then the filtrate pump is shutdown.

The entire system can be drained by opening all valves.

Following, in FIGS. 16 through 20, is the description of a further implemented and automated multiple electrode dewatering apparatus utilizing the principle of operation described above in connection with the schematic views of FIGS. 1 to 4.

Again, assuming the case of the negatively charged particles of a clay suspension, and depending upon production capacity requirements, the apparatus in this example comprises an assembly of a multiplicity of cathodic and anodic electrode structures suspended parallel to one another and in alternation, in the treatment tank 101. These electrode structures may be in the form substantially as illustrated in the above described detail FIGS. 5, 6, 7, and 8, the cathode structures being designated as C-1, C-2, C-3, and C-4, the anode structures as A-1, A-2, A-3, and A-4.

This apparatus comprises a movable hoisting mechanism "K" whereby any of the electrode structures can be raised selectively from full submergence to full emergence, along vertical guides 102 and 103 provided in the tank for the cathode and the anode structures respectively. Normally, the hollow cathode structures remain in submergence for filtrate withdrawal through the fluid pervious filter walls, but may be raised to emergence for inspection or replacement of the filter media. Therefore, flexible tubular conduits (not shown) connect the cathode structures with the vacuum source and with the control system which is not shown, but which may be similar to the one described above in reference to FIG. 14 or FIG. 11b.

The anode structures, however, when in operation, are raised to full emergence selectively in a predetermined and timed sequence by the aforementioned movable hoisting mechanism "K", for the purpose of removal therefrom of the adhering dewatered cake material. If these anode structures be in the form of the hollow box type shown above in FIGS. 5 and 6, they present solid planar electrode faces for the cake material to adhere and would have the aforementioned cooling water connections.

The electrode hoisting mechanism "K" is movable on a pair of overhead rails or tracks 104 and 105 that are parallel coextensive with the tank. Upon these rails the hoisting mechanism can be moved into position over each respective electrode structure in the tank, so that vertical upper guide members 106 and 107 embodied in the hoisting mechanism will register with the lower guide members 102 and 103 in the treatment tank. Gripping devices 106a are provided whereby a respective electrode structure can be seized and released by the hoisting mechanism.

In this way, after a respective anode structure has been raised to emergence, the adhering cake material is stripped by means of scrapers or scraper blades 108 and 109 (see FIG. 16) that become effective as the anode structure is being lowered back into the clay suspension, substantially in the manner described above in reference to FIGS. 1 to 4.

The cake material thus being detached simultaneously from both sides of the electrode structure, falls onto a pair of band conveyers extending transversely of the tank. These conveyers operate and are arranged substantially in the manner illustrated in FIGS. 1 to 4, except for the fact that these conveyers as well as the associated cake stripping devices or scraper blades are unitary with the structure of the movable hoisting mecahnism "K".

In detail, the hoisting mechanism "K", in FIGS. 16, 17, 19 and 20, comprises a wheeled transverse carriage frame or movable bridge 110 the ends of which are supported by pairs of carriage rollers 111 and 112, upon respective tracks. Rigidly connected to the respective ends of this carriage frame are depending composite support structures D-1 and D-2 comprising the upper vertical guide members 106 and 107 for the electrode structures. These depending support structures D-1 and D-2 each comprise a pair of vertical support members 114 and 115 fixed to the carriage and appearing in the form of vertically elongate depending flat members or plates. Each pair of these vertical support members has fixed therebetween one of the vertical electrode guide members 106 and 107. Motorized hoisting means or a winch device 113 are shown mounted on the transverse carriage frame, together with the aforementioned electrode gripping devices 106a details of which have not been shown.

The depending composite support structures D-1 and D-2 have mounted on their lower ends the scraper devices or scraper blades 108 and 109 (shown in FIG. 16, although not shown in the skeleton view of FIG. 20.) that are operable in the manner previously described for stripping the cake material from the respective electrode structures.

Rigidly connected to the lower ends of depending support structures D-1 and D-2 is a platform 116 having a rectangular elongate opening 117 for the passage therethrough of an electrode structure "E" (shown in phanthoms dot-and-dash in FIGS. 17 and 20) when being raised and lowered by the winch or hoisting mechanism. Thus it is seen that the transverse carriage frame 110, the depending support structures D-1 and D-2, and the platform 116 all together constitute a rigid frame structure movable on the aforementioned tracks.

Figure 16:
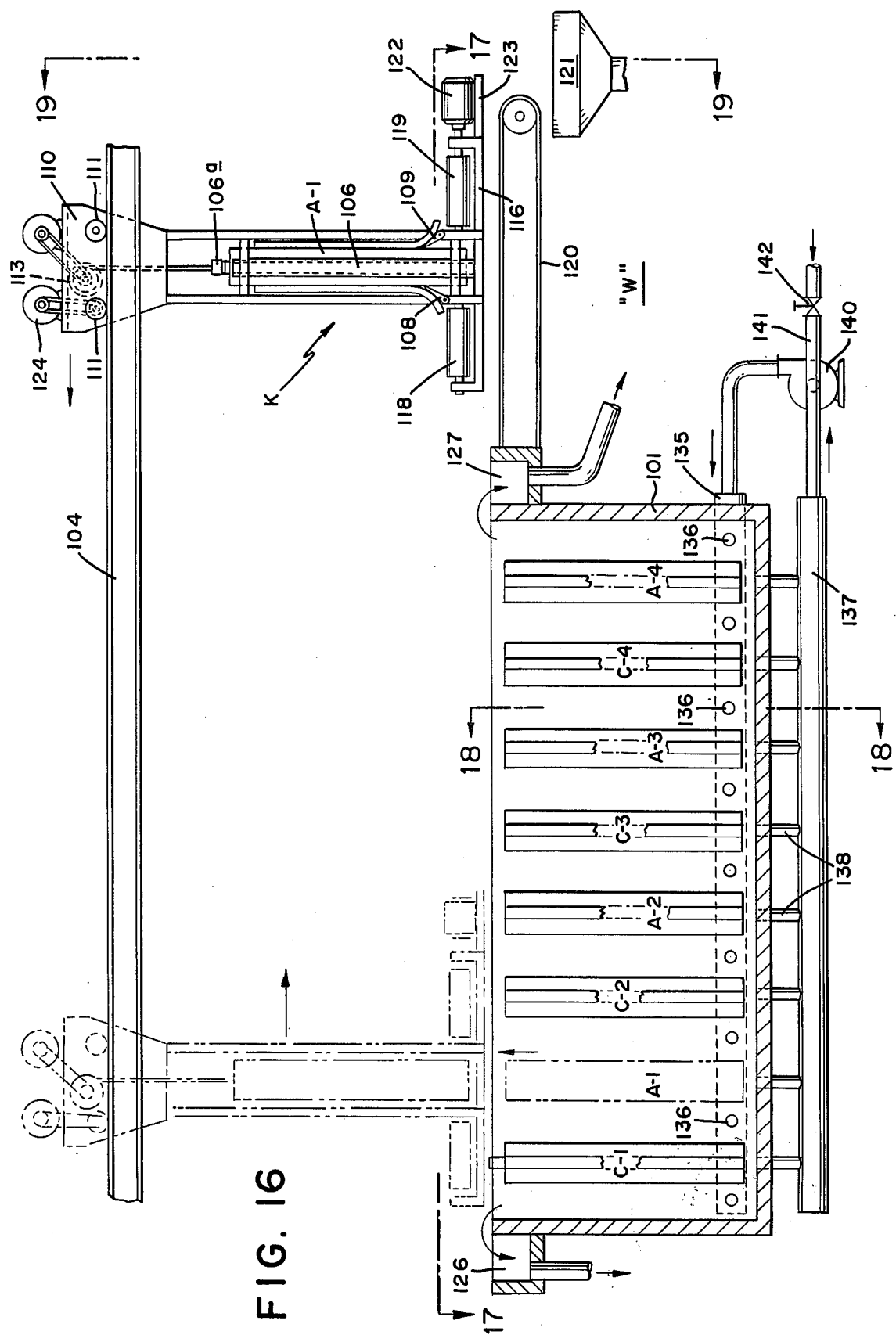
FIG. 16 is a vertical part-sectional view of a further implemented and automated version of a multiple electrode apparatus utilizing the principle illustrated in FIGS. 1 to 4, employing a travelling electrode hoisting mechanism.
Figure 20:
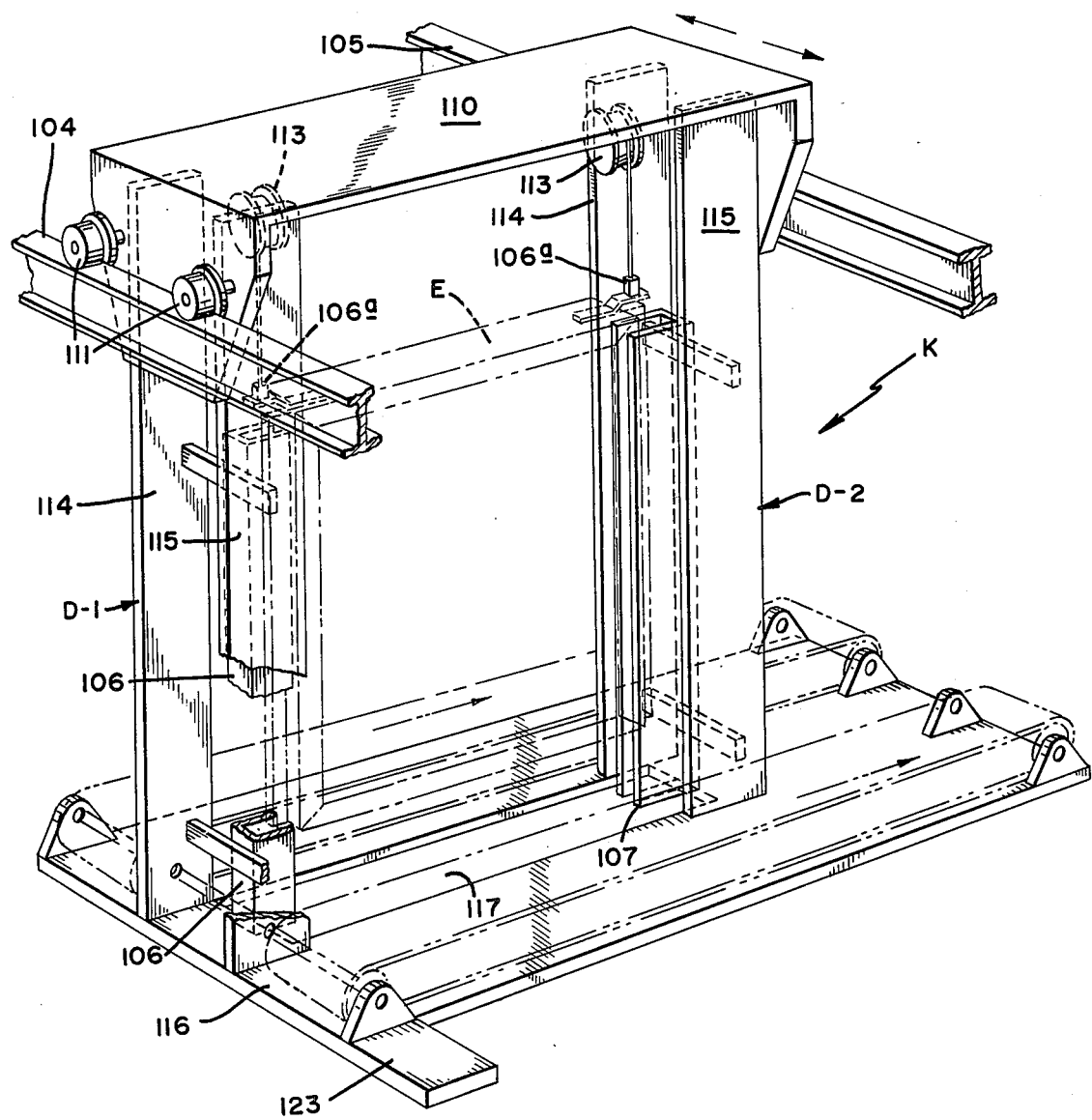
FIG. 20 is a perspective skeleton view of the frame structure of the travelling electrode hoisting mechanism of FIGS. 16, 17, and 19.

As shown in FIGS. 16, 17, 19, and 20, the platform 116 of the frame structure of the electrode hoisting mechanism "K" carries a pair of transverse band conveyers 118 and 119 for receiving the cake material being stripped from the respective electrode structures. They transport the thus intercepted material across the treatment tank, and onto a longitudinal common conveyer 120 (see FIGS. 16 and 19) to a collecting receiver 121. A single motor 122 drives the two transverse band conveyers, as seen in FIG. 16, but not shown in FIG. 20 except for a platform portion 123 indicating its location.

Motorized drive means 124 (shown in FIG. 16, but not shown in the skeleton view of FIG. 20) are furthermore provided atop the transverse carriage frame 110 for moving the hoisting mechanism "K" along the tracks to the respective cake removal positions, that is from one anode structure to the next. The mechanism "K" is also movable on the tracks to a service area "W" beyond the end of the tank, thus allowing for inspection, servicing or replacement of any of the electrode structures lifted from the tank. For that purpose, provision is also made for disconnecting the electrode structures individually from the respective vacuum-or cooling water supplies, by uncoupling the respective flexible flow connections.

As the transverse band conveyers intercept and transport the cake material at the rate at which it is being scraped or detached from the respective electrode structures, it is delivered directly to the common longitudinal conveyer 120. In this way, the cake bearing electrode structures can be serviced in rapid and time saving succession, and thus in a quasicontinuance and uniformly controlled dewatering operation.

Feed slurry or a clay suspension is supplied to the treatment tank through feed inlet 125 at a rate sufficient to allow for an excess to overflow into receiving launders 126 and 127 shown at respective ends of the tank.

To insure that the slurry contents in the tank be kept in a state of uniform dispersion during the dewatering operation, there is provided a circulating pipe system whereby the tank content is being continuously recirculated.

For that purpose, (see FIGS. 16 and 18) there is provided an horizontal inlet header or manifold pipe 135 extending longitudinally of the tank, and having branch pipes 136 leading through a side wall into the tank. These branch pipes deliver the slurry into the spaces between the electrode structures. An horizontal discharge header or manifold pipe 137 has branch pipes 138 leading from the lower end portion of the sloping bottom 139 of the tank. A circulating pump 140 has an intake connection with the discharge manifold pipe 137, while the delivery end of the pump connects with inlet header 135. A slurry-or water supply connection 141 with control valve 142 is provided at the intake side of the pump.

Figure 21:
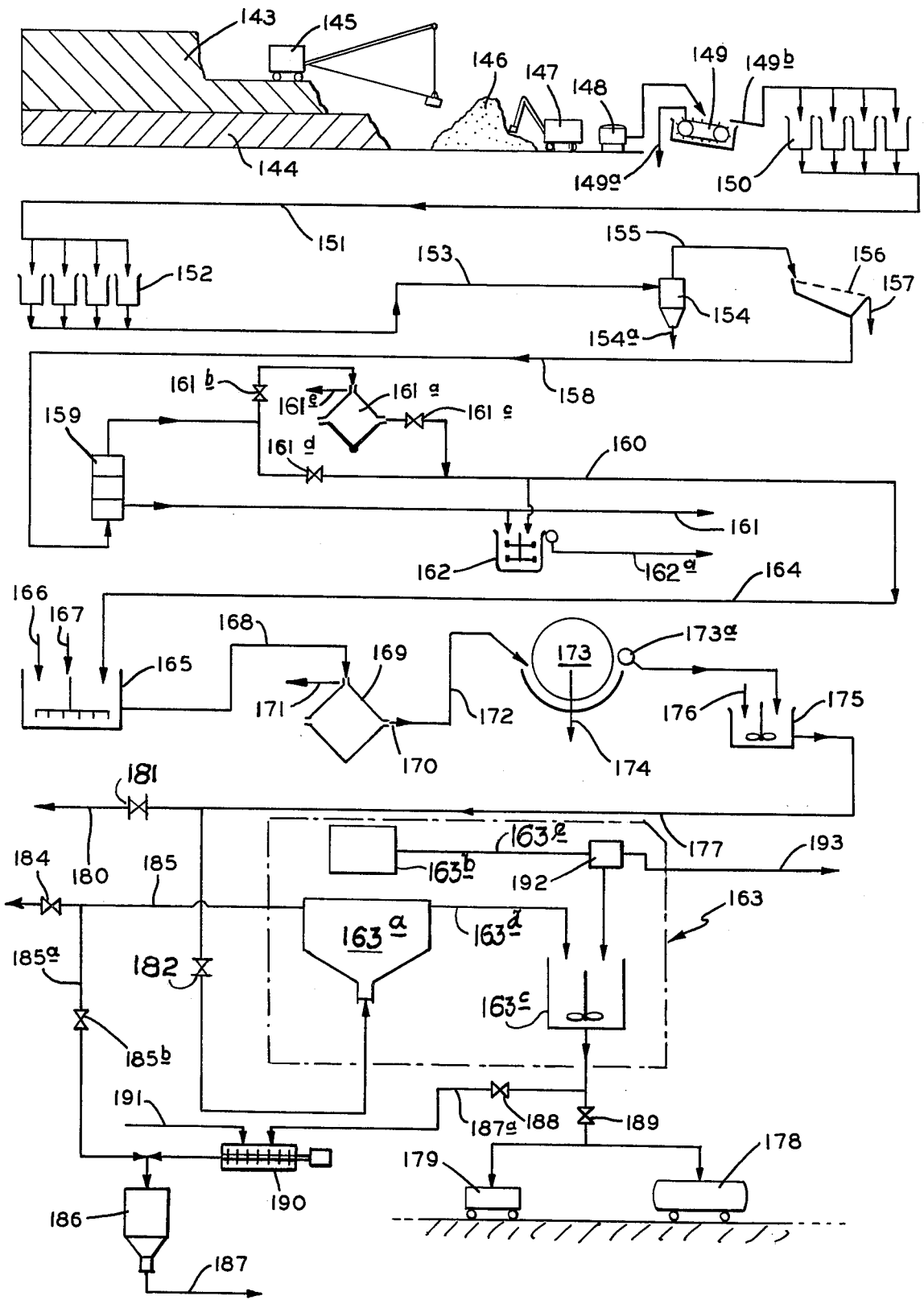
FIG. 21 is a flow sheet example illustrating the production of a clay suspension conditioned for the electro dewatering operation according to this invention.

A practical flowsheet shown in FIG. 21 illustrates the stepwise preparation of the clay suspension, from the clay mine down to the electro-dewatering operation of the invention.

To start at the mine, first the overburden 143 must be removed from the underlying clay strata 144, so as to enable a dragline 145 to accumulate a stockpile of raw clay material 146. A power shovel 147 may then transfer the raw clay from the stockpile to a portable blunger 148, to be converted into pulp. The blunger delivers the pulped material to a drag classifier 149 to effect the initial separation of a coarse fraction 149a of waste material. The liquid fraction 149b, carrying the clay along with other impurities, is deposited in storage tanks 150 located at the mine.

From the mine storage tanks 150, at a solids concentration of about 8%, the material is transferred, through line 151, to storage tanks 152 located at the treatment plant for further conditioning and refining.

From the plant storage tanks 152, the mixture, through line 153, is fed to a wet cyclone separating station 154 effective to rid the mixture of a further waste fraction 154a. The cyclone overflow, through line 155, reaches a screening station 156 for effecting the removal from the clay mixture of another waste fraction 157. The thus conditioned clay suspension or underflow from the screening station is transferred, via line 158, to a wet cyclone station 159 where clay solids in the suspension are separated into a fraction 160 commercially destined as "Coating Grades" wherein about 90% of the clay solids are smaller than 2 microns. A coarser clay fraction 161 from this cyclone station will meet the commercial demand for "Filler Grades".

"Coating Grade" fraction material 160 as well as "Filler Grade" material 161 may be diverted in order to be subjected to the beating action provided by a delamination tank 162, thus producing clay solids as "Delaminated Grades" 162a.

A centrifuge 161a is shown in parallel connection to line 160 for further dewatering if required, with valves 161b, 161c and 161d provided for suplementing this mode of operation. Overflow of separated water from this centrifuge is indicated at 161e.

However, for the present purpose, it is the above-defined "Coating Grades" clay material 160 that is to undergo several intermediate dewatering treatment steps, before being subjected to final dewatering in an electro-dewatering apparatus system 163, the construction and function of which have been described in connection with the embodiments exemplified in FIGS. 11 through 20 above.

This schematic showing of the electro-dewatering apparatus 163 corresponds in principle to the FIG. 16 embodiment, with a treatment tank indicated at 163a, an electrode structure shown in emerged position at 163b in combination with a mixing or blending tank 163i c such as appears in FIG. 11, adapted to receive overflow suspensions 163d from the treatment tank and cake material 163e stripped from the emerged electrode structure.

The electro-dewatering apparatus 163 may operate in conjunction, or in series with a spray drying operation. Accordingly, after closing a valve 184, overflow slurry 185 from the electro treatment tank 163a via line 185a and control valve 185b may be sent to a spray drying station 186 producing a spray dried or dry powdered product 187. Alternatively, slurry from blending tank 163c may be sent to the spray drying station 186, via line 187a and control valve 188. After closing a control valve 189, this slurry preferably is delivered to a blunger 190 where a dispersing agent 191 may be added, conditioning the slurry for spray drying.

Adjustments may be made in either case, if needed, as to solids concentrations of these slurries, for spray drying.

In view of what has been stated previously, it will also be understood that the overflow slurry 185 itself may represent a product obtainable from the electro-dewatering operation, having a desired solids concentration.

Accordingly, the above-defined "Coating Grades" fraction is transferred, via line 164, to an agitator tank 165, where a bleach material 166 is added, as well as an acid 167 for inducing flocculation of the dispersed clay particles, preparatory to the subsequent intermediate water separating steps. In this way, a flocculated suspension of about 17% to 25% solids concentration is transferred from the agitator tank 165, via line 168, to a dewatering centrifuge 169 delivering a flocculated suspension 170 of about 45% solids concentration, while releasing a separated fraction 171 of carrier liquid to waste.

A line 172 carries the thus dewatered suspension 170 for further dewatering to a continuous rotary vacuum drum filter 173, delivering a filter cake 173a, and separated filtrate liquid 174. The filter cake material is delivered to a blunger 175 where a dispersing agent 176 is introduced, in order to deliver, through line 177, a thus deflocculated or dispersed suspension of about 60% solids concentration. Thus conditioned, the suspension is fed to electro-dewatering system 163 such as the above-described, and operable to eventually deliver a colloidal clay suspension adapted to meet the aforementioned industrial demand of a 70% solids concentration. Tank cars 178 or tank trucks 179 may receive this concentrated yet fluid product for delivery to their industrial destination. Line 180 is to indicate that slurry from tank 175 may be sent to a conventional spray drying station producing the commercial dry powder product which may be bagged for shipment. Valves 181 and 182 allow for directing or proportioning the slurry feed accordingly.

From the foregoing it should also be understood that in the operation of the electro-dewatering apparatus of this invention, which may also be termed an electro filter for solids-liquid separation, electrodeposited solids can be recovered directly from a colloidal feed suspension in the form of a firm or relatively hard cake formation of very low moisture content, which may represent a desired product of itself. Accordingly, a portion or all of the recovered cake material 163e, through proportioning station 192, may be diverted from blending tank 163c, to constitute the recovered cake product 193.

Alternatively, recovered cake material may be blended with feed slurry or overflow suspension from the treatment tank in proportions such as to obtain a slurry of a specified higher solids concentration as the desired product.

Yet, by way of another alternative, the operation of the electro-dewatering apparatus may be conducted in a manner whereby the overflow suspension itself is obtainable as the product in the form of a slurry of a desired solids concentration, with any solids deposits or cake formation on the electrodes being incidental or minimized.

For best results, the feed suspension for the electro separating operation may require preconditioning with a dispersing agent to establish a suitable suspension. In these conditions, the electro filter is capable of what figuratively speaking may in effect amount to high rate filtration of otherwise difficult to filter colloidal suspensions. This again is in contrast with the coagulation pretreatment required of a feed suspension to be subjected to separation or solids concentration in customary filtration equipment.

EXAMPLE A

Performance measurements made with a continuously operating rotary disc type of electro-dewatering device with one square foot each of anode and cathode surface areas. The type of apparatus used was the one embodying the principle illustrated in FIGS. 11, 12, 13, 14 and 15. Typical results found when thus treating Kaolin clay were:

Feed rate: 22.5 lbs/hr.
Feed solids: 61%
Filtrate rate: 2.5 lbs/hr.
Cake rate: 15.0 lbs/hr.
Cake solids: 76%
Bath overflow rate: 5.0 lbs/hr.
Bath solids: 52%
Product rate: 20.0 lbs/hr.
Product solids: 70%
Voltage applied: 14 volts
Current flow: 8 amperes

EXAMPLE B

Electro-osmotically aided filtration.

Bench tests were performed on several materials, indicating their applicability for the purposes of this invention, such as slimes, slurries, wood pulp etc. A laboratory filter leaf batch type test unit was used, with vacuum only applied, and at several voltage levels as compared with the electrically aided vacuum filtration. For the present purpose, there was provided an anode above, and a cathode below the horizontal filter leaf placed in such a bench type test unit.

The systems thus studied are as follows:

1. Acid Lustra (clay) from clay plant (25% solids).
2. Aragonite from pilot plant filter cake (−325 mesh sample).
3. Phosphate Slimes (3% solids) from Freeport Chemical Company, Fort Meade, Florida.
4. Wet basic nickel carbonate reslurried as hot water to 10% solids. (Sample obtained from P. L. Burnside, Belle Classe, La).
5. Wood pulp from Herty Foundation. Hard wood sulfite (Weyerhauser Company) 80% Alden / 20% Hemlock.

The following Tabulation of these tests indicates the ratio of solids concentrations attainable per unit of time, as between electrically aided filtration and straight filtration. For example for "Lustra" the ratio 7 indicates that for electrically aided filtration the effect is seven times that of straight vacuum filtration:

| Sample # | Ratio = % Solids/min at 100 volts / % Solids/min at no current and 40 − 45% | |
|---|---|---|
| 1 | Lustra | 7 |
| 2. | Aragonite (Calcium Carbonate) (filter cake reslurried) | 5.86 |
| | Aragonite (−325 7) | 14 (at 50 volt) |
| | Aragonite | 25.7 |
| 3. | Phosphate Slimes | 16 (at 20%) |
| 4. | Nickel Carbonate | 3.38 (at 20%) |
| 5. | Wood Pulp (1%) | 2.92 (at 15%) |
| | Wood Pulp (3%) | 4.64 (at 25%) |

What is claimed is:

1. A treatment system for dewatering a suspension of solids in a carrier liquid, subject to the influence of an electric field, which comprises,
    a treatment tank,
    feed means for supplying a flow of said suspension to the tank, with means for containing therein a body of the suspension of a predetermined depth,
    a pair of self-contained mutually opposed electrode structures positioned in said tank as a cathodic electrode and as an anodic electrode having between them a controllable electric field, while submerged in said body suspension of said depth,
    one of said electrode structures being adapted for the formation thereon of a layer of suspension solids under the influence of said electric field, the second of said electrode structures comprising a hollow body having a liquid pervious wall representing a filtration area opposite to said electrode surface of the one electrode structure, and adapted for the passage therethrough of a flow of carrier liquid as filtrate separated from solids migrating in the opposite direction towards said one electrode structure under the influence of the electric field,
    a vacuum supply connected to the hollow body of said second electrode structure, adapted to provide a pressure differential for effecting passage of said carrier liquid through said filtration area,
    pumping means effective separate from the vacuum supply for drawing filtrate liquid from the said hollow electrode structure at a controlled rate against the vacuum,
    and actuating means operable for removing and recovering said layer of suspension solids from said electrode surface.

2. The system according to claim 1, wherein said liquid pervious wall comprises a non-conductive filter media and a supporting grid therefor.

3. The system according to claim 1, wherein said liquid pervious wall comprises a non-conductive filter media and a conductive supporting grid therefor.

4. The treatment system according to claim 1, wherein said containing means comprise an overflow for said tank.

5. The treatment system according to claim 1, wherein said one electrode structure is the anode adapted for the formation thereon of said layer of solids having a net negative charge, while carrier liquid passes through the hollow counter electrode, adapted to be drawn off by said pumping means.

6. The treatment system according to claim 1, wherein said one electrode structure is the cathode adapted for the formation thereon of said layer of solids having a net positive charge, while carrier liquid passing through the hollow counter electrode is adapted to be drawn off by said pumping means.

7. The treatment system according to claim 1, wherein said second electrode structure comprises a frame, filter media extending across each open side of said frame, and peripherally connected to the frame, and grid means connected to the frame, providing flow pervious back up areas for the respective filter media subject to the effect of said vacuum supply.

8. The treatment system according to claim 1, wherein said actuating means comprise mechanism operable for raising said first electrode from a position of submergence to a position of emergence of said layer of suspension solids, and to return to submergence,
and stripping devices constructed and arranged for detaching said layer from said first electrode structure during exposure thereof from said suspension, and receiving means for intercepting the layer material being detached by said stripping devices.

9. The treatment system according to claim 8, wherein said one electrode structure is constructed and arranged for the formation of a layer of said solids on either side, and wherein said stripping devices comprise a doctor blade provided at either side of said one electrode, said blades being movable between stripping and non-stripping positions, and actuating means for holding said doctor blades in non-stripping position during upward movement of said electrode structure, and for holding said blades in stripping position effective to detach the cake formation during downward return movement of said electrode structure.

10. The treatment system according to claim 1, wherein said one electrode structure is constructed and arranged for the formation of a layer of said solids on either side, and wherein said stripping devices comprise a doctor blade provided at either side of said one electrode, said blades being movable between stripping and non-stripping positions, and actuating means for holding said doctor blades in stripping position during upward movement of said electrode structure, to detach said layer during upward movement.

11. The treatment system according to claim 1, wherein said one electrode structure is in the form of a closed hollow body presenting a pair of electrode faces opposite to each other, and connections for circulating cooling water through said hollow body.

12. The treatment system according to claim 1, wherein master control means are provided, comprising means for establishing and maintaining vacuum held liquid level of filtrate liquid, and monitor devices responsive to variations in said vacuum held liquid level between predetermined limits, adjusting means for varying the vacuum, and relay means constructed and arranged for influencing said adjusting means as directed by said monitor devices.

13. The treatment system according to claim 1, wherein control means are provided, comprising means for establishing and maintaining a vacuum held liquid level of filtrate liquid, monitor devices responsive to variations in said vacuum held liquid level, adjusting means for causing the raising or lowering of said liquid level, and relay means effective between said monitor devices and said level adjusting means, constructed and arranged for causing corrective variations in said liquid level for maintaining the same within predetermined limits.

14. The treatment system according to claim 1, wherein control means are provided, comprising means for establishing and maintaining a vacuum held liquid level of filtrate liquid, and control means are provided, comprising means for establishing and maintaining a vacuum held liquid level of filtrate liquid, monitor devices responsive to variations in said level between predetermined limits, adjusting means for varying the vacuum, said limits being determined by the provision of electric probe contacts cooperatively associated with said liquid level, and positioned in accordance with said limits, and operatively connected to said vacuum adjusting means, and relay means constructed and arranged for influencing said vacuum adjusting means as directed by the function of said probe contacts so as to maintain said liquid level at intermediate positions.

15. The treatment system according to claim 1, wherein control means are provided, comprising means for establishing and maintaining a vacuum held liquid level of filtrate liquid, and monitor devices responsive to variations in the vacuum held filtrate level between predetermined limits, adjusting means for varying the vacuum, and relay means constructed and arranged for influencing said pumping rate as directed by said monitor devices, so as to maintain said liquid level at intermediate positions.

16. The treatment system according to claim 1, wherein control means are provided, comprising means for establishing and maintaining a vacuum held liquid level of filtrate liquid, and monitor devices responsive to variations in the throughflow resistance of the filtration area of said second electrode structure and thus to variations in the rate of throughflow through said area, and therefore responsive to variations in the vacuum held filtrate liquid level as between predetermined limits, adjusting means for varying the density of the electric current, and relay means constructed and arranged for influencing said current adjusting means as directed by said monitor devices, so as to compensate for an increase in said throughflow rate by a corresponding decrease in said current density and vice versa so as to maintain said throughflow rate within said predetermined limits.

17. The treatment system according to claim 1, wherein control means are provided comprising means for establishing and maintaining a vacuum held liquid level of filtrate liquid, and monitor devices responsive to variation in the throughflow resistance of the filtration area of said second electrode structure and thus to variations in the rate of throughflow through said area, and therefore responsive to variations in the vacuum held filtrate liquid level as between predetermined limits defined by the provision of respective electric probe contact terminals associated with said liquid level, adjusting means for varying the density of the electric current, and relay means cooperatively connected to said probe terminals for influencing said current adjusting means, so as to compensate for an increase in said throughflow rate by a corresponding decrease in said current density and vice versa, and to maintain said throughflow rate within said predetermined limits.

18. The treatment system according to claim 1, wherein control means are provided, comprising means for establishing and maintaining a vacuum held liquid level of filtrate liquid, and monitor devices responsive to variations in the throughflow resistance of the filtration area of said second electrode structure and thus to variations in the rate of throughflow through said area, and therefore responsive to variations in the vacuum held filtrate liquid level as between predetermined limits being determined by the provision of flow meter indications corresponding to said liquid level variations, adjusting means for varying the current density, and relay means influenced by said monitor devices so as to compensate for an increase in said throughflow rate by a corresponding decrease in said current density and vice versa, and to maintain said throughflow rate within said predetermined limits.

19. Apparatus for dewatering a suspension of solids in a carrier liquid subject to the effect of an electric field, which comprises, a treatment tank, feed means for supplying said suspension to the tank, associated with means for maintaining therein a body of the suspension of a predetermined depth, a first series of vertical planar electrode structures adapted for the formation thereon of a layer of solids from the suspension under the influence of said electric field, each said electrode structure being movable vertically in its own plane to emergence from said suspension and back into submergence, a second series of vertical planar electrode structures arranged as counter electrodes in alternation with the electrode structures of the first series in said suspension, so that cathodic electrode structures alternate with anodic electrode structures, all being spaced predetermined distances from one another and parallel to one another, an overhead track structure extending above and along said series of electrode structures, a carriage movable upon and along said track structure, a depending structure extending rigidly downwardly from said carriage, and having vertical guide means movable to registry with a selected electrode structure by the movement of said carriage, for guiding said electrode structure to the position of emergence, said selected electrode structure carrying a solids layer on either side electrodeparted from the suspension, hoisting means for raising and lowering selected electrode structures along said guide means between positions of emergence and submergence, a pair of stripping devices mounted on said depending structure opposite to one another, and operable to detach said layer of suspension solids during exposure thereof from the suspension, and disposal means carried by said depending structure for intercepting the cake material.

20. The apparatus according to claim 19, wherein said second series of electrode structures each comprise a hollow body having a liquid pervious wall representing a filtration area, a vacuum supply connected to the hollow body of said second electrode to provide a pressure differential for effecting passage of said carrier liquid through said filtration area, and pumping means effective separate from the vacuum supply for drawing filtrate liquid from said hollow electrode structure at a controlled rate balanced against the vacuum.

21. The apparatus according to claim 20, wherein said disposal means comprise conveyer means cooperatively associated with said stripping devices, and constructed and arranged so as to intercept the material being stripped for immediate delivery away from the tank.

22. The apparatus according to claim 20, wherein said disposal means comprise band conveyer means cooperatively associated with said stripping devices, and constructed and arranged so as to intercept the material being stripped for immediate delivery away from the tank.

23. The apparatus according to claim 20, wherein a source of vacuum is provided connected to said hollow electrode bodies for causing carrier liquid of said suspension to pass through said filtration areas, and wherein provision is made for similarly raising and lowering the electrode structures of said second series.

24. The apparatus according to claim 20, wherein said stripping devices are in the form of respective doctor blades swingable about a horizontal axis between neutral and cake stripping positions.

25. Apparatus for dewatering a suspension of solids in a carrier liquid subject to the effect of an electric field which comprises, a treatment tank, feed means for supplying said suspension to the tank, associated with means for maintaining therein a body of the suspension of a predetermined depth providing for submergence of electrode structures in the tank, a first electrode structure adapted for the formation thereon of a layer of solids from the suspension under the influence of an electric field, said electrode structure being movable to emergence from said suspension and back into submergence, a second electrode structure representing the counter electrode to said first electrode structure in said suspension, hoisting means for raising and lowering said first electrode structure between positions of emergence and submergence, vertical guide means defining the movement of said electrode structure, stripping devices constructed and arranged for detaching said solids layer during exposure of said electrode structure by said hoisting means, and disposal means constructed and arranged for intercepting said layer of suspension solids thus being detached.

26. The apparatus according to claim 25, wherein said second series of electrode structures each comprise a hollow body having a liquid pervious wall representing a filtration area, a vacuum supply connected to the hollow body of said second electrode to provide a pressure differential for effecting passage of said carrier liquid through said filtration area, and pumping means effective separate from the vacuum supply for drawing filtrate liquid from said hollow electrode structure at a controlled rate balanced against the vacuum.

27. The apparatus according to claim 26, wherein said disposal means comprise conveyer means cooperatively associated with said stripping devices, and constructed and arranged so as to intercept the material being stripped for immediate delivery away from the tank.

28. The apparatus according to claim 26, wherein said disposal means comprise band conveyer means cooperatively associated with said stripping devices, and constructed and arranged so as to intercept the material being stripped for immediate delivery away from the tank.

29. The apparatus according to claim 26, wherein said stripping devices are in the form of respective doctor blades swingable about a horizonal axis between neutral and cake stripping positions.

30. Apparatus for dewatering a suspension of solids in a carrier liquid, subject to the effect of an electric field, which comprises, a treatment tank, feed means for supplying said suspension to the tank, associated with means for maintaining therein a body of the suspension of a predetermined depth providing for submergence of electrode structures in the tank, a first electrode structure in the form of a disc rotatable about an horizontal axis with the lower portion of said disc immersed in said suspension, and adapted for the formation thereon of a layer of solids from the suspension under the influence of the electric field, said layer of suspension solids being produced continuously during rotation of the disc, said disc being mounted upon a shaft supported on the tank, a stationary electrode structure representing the counter electrode to said rotatable electrode in said suspension, said electrode structure comprising a hollow body having a liquid pervious electrode wall representing a filtration area facing the opposed immersed portion of said disc shaped electrode structure, vacuum actuated means connected to said hollow body of the stationary electrode structure means provided for withdrawing carrier liquid through said filtration area, separate from the vacuum connection, means for stripping said cake formation continuously from the upper emerged portion of said disc during its rotation, and conveyer means for continuously intercepting and removing the stripped material from the tank.

31. The apparatus according to claim 30, wherein said conveyer means comprise a substantially horizontal band conveyer having an endless conveyer band the inner end of which surrounds, and is driven by said shaft.

32. The apparatus according to claim 30, wherein said stationary electrode structure is interposed between a pair of disc electrode structures, and said conveyer means comprise a substantially horizontal band conveyer having an endless conveyer band the inner end of which surrounds, and is driven by said shaft, and adapted to receive the material stripped from the both mutually facing emerged portions of said pair of disc electrode structures.

33. A treatment system for dewatering a suspension of solids in a carrier liquid, subject to the influence of an electric field, which comprises, a treatment tank, feed means for supplying a flow of said suspension to the tank at a selected rate, means for containing in said tank a body of said suspension, a pair of mutually opposed electrode structures positioned in said tank as a cathodic electrode and as an anodic electrode having between them a controllable electric field, while submerged in said suspension, one of said electrode structures upon activation being adapted for the formation thereon of a layer of suspension solids, the second of said electrode structures comprising a hollow body having a liquid pervious wall representing a filtration area opposite to said electrode surface of the one electrode structure, and upon activation adapted for the passage therethrough of a flow of carrier liquid as filtrate separated from solids migrating in the opposite direction towards said one electrode structure under the influence of the electric field, vacuum means connected to the hollow body of said second electrode structure, adapted to provide a pressure differential for effecting passage of said carrier liquid through said filtration area, means effective separate from the vacuum supply for drawing filtrate liquid from the said hollow electrode structure at a controlled rate balanced against the vacuum, and actuating means selectively operable for removing the layer of suspension solids from said one electrode surface.

34. The treatment system according to claim 33, wherein said containing means comprise an overflow for said tank.

35. The system of claim 34, wherein means are provided for containing the body of the suspension at a predetermined depth within the tank, sufficient for submergence of said electrode structures.

36. The system of claim 33, wherein said mans for removing the layer of suspended solids from said first electrode surface include means for recovering said layer from the tank, and wherein means are provided for blending said tank overflow with said recovered layer to form a desired product.

37. The system of claim 36, wherein the layer of suspension solids is a cake formation.

38. The system according to claim 33, wherein means are provided for recovering product slurry from the dewatering operation of said tank, having a desired solids concentration substantially higher than the feed slurry.

39. The system according to claim 33, wherein means are provided for recovering overflow slurry from the dewatering operation of said tank, having a desired solids concentration substantially higher than the feed slurry.

40. The treatment system according to claim 33, with the addition of a spray drying station, and means for feeding overflow slurry from said treatment tank to said spray drying station.

41. The treatment system according to claim 33, with the addition of a spray drying station, means for feeding overflow slurry from said treatment tank to said spray drying station, and means for controlling the solids concentration of said slurry being fed to said spray drying station.

42. The treatment system according to claim 33, with the addition of a spray drying station, and wherein there are provided means for blending said layer with overflow slurry from said treatment tank, providing a resulting slurry of desired solids concentration, and means for feeding such slurry to said spray drying station.

43. The treatment system according to claim 42, with the addition of blunger means for subjecting said resulting slurry to treatment with a dispersing agent.

* * * * *